(12) United States Patent
Mori

(10) Patent No.: US 9,587,730 B2
(45) Date of Patent: Mar. 7, 2017

(54) DIFFERENTIAL DEVICE

(71) Applicant: MUSASHI SEIMITSU INDUSTRY CO., LTD., Toyohashi-shi, Aichi (JP)

(72) Inventor: Hiroyuki Mori, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 15/184,027

(22) Filed: Jun. 16, 2016

(65) Prior Publication Data

US 2016/0369885 A1 Dec. 22, 2016

(30) Foreign Application Priority Data

Jun. 18, 2015 (JP) .................. 2015-123201
Oct. 7, 2015 (JP) .................. 2015-199797
Nov. 27, 2015 (JP) .................. 2015-232392

(51) Int. Cl.
  *F16H 57/04*   (2010.01)
  *F16H 48/08*   (2006.01)
  *F16H 48/40*   (2012.01)

(52) U.S. Cl.
  CPC ......... *F16H 57/0428* (2013.01); *F16H 48/08* (2013.01); *F16H 48/40* (2013.01); *F16H 57/0483* (2013.01)

(58) Field of Classification Search
  CPC .. F16H 57/04; F16H 57/0427; F16H 57/0428; F16H 57/0483
  See application file for complete search history.

(56) References Cited

U.S. PATENT DOCUMENTS

| 6,413,183 | B1 * | 7/2002 | Ishikawa ................. F16H 48/08 |
|           |      |        | 475/160 |
| 6,743,136 | B1 * | 6/2004 | Jensen ................ F16H 57/0427 |
|           |      |        | 475/160 |
| 6,964,629 | B2 | 11/2005 | Tsung |
| 9,140,352 | B2 | 9/2015 | Inukai et al. |

(Continued)

FOREIGN PATENT DOCUMENTS

| JP | 2606235 Y2 | 10/2000 |
| JP | 2002-147580 A | 5/2002 |

(Continued)

*Primary Examiner* — Huan Le
(74) *Attorney, Agent, or Firm* — Carrier Blackman & Associates, P.C.; Joseph P. Carrier; William D. Blackman

(57) ABSTRACT

A differential device includes: an input member inputted with driving force; a differential gear supported in the input member and capable of rotating relative to the input member and revolving around rotation center of the input member with rotation of the input member; paired output gears each including a tooth portion meshing with the differential gear and a shaft portion located radially inward of the tooth portion; a washer interposed between the input member and back surface of the tooth portion; and an oil groove provided in a recess shape in surface of the input member facing back surface of each output gear and extending from periphery of the shaft portion to back surface of the washer. The oil groove is arranged offset in peripheral direction of the output gear from a meshing portion between the tooth portion and the differential gear.

19 Claims, 14 Drawing Sheets

(56) References Cited

U.S. PATENT DOCUMENTS

2011/0212805 A1\* 9/2011 Hilker ................. F16H 57/0483
　　　　　　　　　　　　　　　　　　　　　475/160
2016/0208905 A1\* 7/2016 Obayashi ............ F16H 57/0427

FOREIGN PATENT DOCUMENTS

| JP | 2005-048903 A | 2/2005 |
| JP | 2009-168070 A | 7/2009 |
| JP | 2011-038546 A | 2/2011 |

\* cited by examiner

DIFFERENTIAL DEVICE

BACKGROUND OF THE INVENTION

Field of the Invention

The present invention relates to a differential device which is provided in a vehicle such as, for example, an automobile.

Description of the Related Art

Japanese Utility Model Registration No. 2606235 has made known a conventional differential device in which a washer is interposed between a back surface of a tooth portion of each of output gears and an input member (for example, a differential case) and an oil groove guiding lubricant oil is provided in a recess shape in a surface of the input member facing the back surface of each output gear.

In the conventional device, on the surface of the input member facing the back surface of each output gear, particularly on a region part of said surface of the input member, which is located on a back surface side of a meshing portion between the output gear and a differential gear, large thrust reaction force acts from the meshing portion via the tooth portion of the output gear and the washer.

In spite of the above situation, an oil groove in the conventional device is formed in the region part located on the back surface side of the meshing portion in the surface of the input member facing the back surface of the output gear, namely, the region part on which the large thrust reaction force acts. This may cause a decrease in support rigidity of the region part which needs to bear large load burden, so that durability of the region part, accordingly durability of the input member may deteriorate. In addition, due to concentration of the load on an edge portion of the oil groove, the durability of the input member may deteriorate.

Furthermore, such problems may arise more seriously in a differential device whose input member, in particular, is required to be reduced in thickness and weight, such as a differential device which is made thinner in an axial direction of the output gears of the differential device by making the diameter of the output gears sufficiently larger than that of the differential gears such that the output gears can have a sufficiently larger number of teeth than that of the differential gears.

SUMMARY OF THE INVENTION

The present invention has been made with the foregoing situation taken into consideration. An object of the present invention is to provide a differential device capable of solving the above-mentioned problem with a simple structure.

In order to achieve the object, a differential device according to the present invention, comprises: an input member inputted with driving force; a differential gear supported in the input member and being able to rotate relative to the input member and revolve around a rotation center of the input member in accordance with a rotation of the input member; a pair of output gears each including a tooth portion placed in mesh with the differential gear, and a shaft portion located radially inward of the tooth portion; a washer interposed between the input member and a back surface of the tooth portion of each of the output gears; and an oil groove provided in a recess shape in a surface of the input member facing a back surface of each of the output gears, the oil groove extending from a periphery of the shaft portion of the output gear to a back surface of the washer, wherein the oil groove is arranged offset in a peripheral direction of the output gear from a meshing portion between the tooth portion and the differential gear. (This is a first characteristic of the present invention.)

According to the first characteristic, the differential device includes: the washer interposed between the input member and the back surface of the tooth portion of each of the output gears; and the oil groove which is provided in the recess shape in the surface of the input member facing the back surface of the output gear, the oil groove extending from the periphery of the shaft portion of the output gear to the back surface of the washer. Thus, using centrifugal force, lubricant oil can be effectively supplied from the periphery of the shaft portion of the output gear to the back surface of the washer via the oil groove. Accordingly, even when large thrust reaction force acts on the washer from the differential gear via the output gear, a sliding portion between the washer and the back surface of the output gear can be sufficiently lubricated. In addition, the oil groove is arranged offset in the peripheral direction of the output gear from the meshing portion between the tooth portion of the output gear and the differential gear. Thus, the oil groove can be placed out of particularly a region part, on which large thrust reaction force acts, in the surface of the input member facing the back surface of the output gear, namely, the region part located on the back surface side of the meshing portion. This can inhibit a decrease in support rigidity of the region part which needs to bear large load burden, and accordingly can contribute to an improvement of durability of the input member.

In the differential device according to the present invention, preferably, the input member includes a side wall portion facing the back surface of each of the output gears, the side wall portion includes a plurality of through-holes or recessed holes arranged at intervals in a peripheral direction of the input member, and the oil groove is arranged passing through between two of the through-holes or recessed holes placed adjacent to each other in the peripheral direction. (This is a second characteristic of the present invention.)

According to the second characteristic, the input member includes the side wall portion facing the back surface of each of the output gears; the side wall portion includes the plurality of through-holes or recessed holes arranged at intervals in the peripheral direction of the input member; and the oil groove is arranged passing through between two of the through-holes or recessed holes placed adjacent to each other in the peripheral direction. Thus, such provision of the through-holes or recessed holes makes it possible to achieve a reduction in the weight of the input member while considering weight balance of the input member, and to form the sufficiently long oil groove while avoiding the through-holes or recessed holes (without the through-holes or the like obstructing the oil groove).

In the differential device according to the present invention, preferably, an oil reserving portion is provided in a recess shape in an inner peripheral portion of a surface of the input member facing each of the output gears, the oil reserving portion facing an outer periphery of the shaft portion of the output gear. (This is a third characteristic of the present invention.)

According to the third characteristic, the oil reserving portion is provided in the recess shape in the inner peripheral portion of the surface of the input member facing each of the output gears, the oil reserving portion facing the outer periphery of the shaft portion of the output gear. Thus, supply of the lubricant oil to the oil groove can be appropriately adjusted using the oil reserving portion. For example, in an initial stage of a differential operation of the differential device, the lubricant oil can be smoothly supplied to the oil groove, accordingly to the washer and the like using the lubricant oil stored in the oil reserving portion. On the other hand, an excess of the lubricant oil can be temporarily stored in the oil reserving portion to make the stored excess of the lubricant oil available when the supply of the lubricant oil to the oil groove becomes insufficient.

In the differential device according to the present invention, preferably, the oil groove is arranged near the meshing portion in the peripheral direction of the output gear. (This is a fourth characteristic of the present invention.)

According to the fourth characteristic, the oil groove is arranged near the meshing portion in the peripheral direction of the output gear. This makes it possible to place the oil groove as close as possible to particularly the region part, which is acted on by the large thrust reaction force, in the surface of the input member facing the back surface of each of the output gears, namely, the region part located on the back surface side of the meshing portion, while placing the oil groove out of the region part. Thereby, the region part which needs to bear large load burden can be effectively lubricated while inhibiting the decrease in the support rigidity of the region part.

In the differential device according to the present invention, preferably, as seen in a projection plane orthogonal to a rotation axis of the output gears, a pair of the oil grooves are arranged with the meshing portions interposed therebetween. (This is a fifth characteristic of the present invention.)

According to the fifth characteristic, a pair of the oil grooves are arranged with the meshing portion interposed therebetween. The region part which needs to bear large load burden can be more effectively lubricated while inhibiting the decrease in the support rigidity of the region part.

In the differential device according to the present invention, preferably, the differential gear is supported in the input member via a differential gear support portion supported in the input member, and $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and $Z1/Z2>2$ is satisfied, where Z1, Z2, d2 and PCD denote the number of teeth of each of the output gears, the number of teeth of the differential gear, a diameter of the differential gear support portion and a pitch cone distance, respectively. (This is a sixth characteristic of the present invention.)

According to the sixth characteristic, the differential device as a whole can be sufficiently reduced in width in the axial direction of the output shafts while securing the strength (for example, the static torsion load strength) and the maximum amount of torque transmission at approximately the same levels as the conventional differential device. Accordingly, the differential device can be easily incorporated in a transmission system, which is under many layout restrictions around the differential device, with great freedom and no specific difficulties, and is therefore advantageous in reducing the size of the transmission system.

In the differential device according to the present invention, preferably, $Z1/Z2 \geq 4$ is satisfied. (This is a seventh characteristic of the present invention.)

In the differential device according to the present invention, preferably, $Z1/Z2 \geq 5.8$ is satisfied. (This is an eighth characteristic of the present invention.)

According to the seventh and eighth characteristics, the differential device can be more sufficiently reduced in width in the axial direction of the output shafts while securing the strength (for example, the static torsion load strength) and the maximum amount of torque transmission at approximately the same levels as the conventional differential device.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention will be described below based on the attached drawings.

Figure 1:
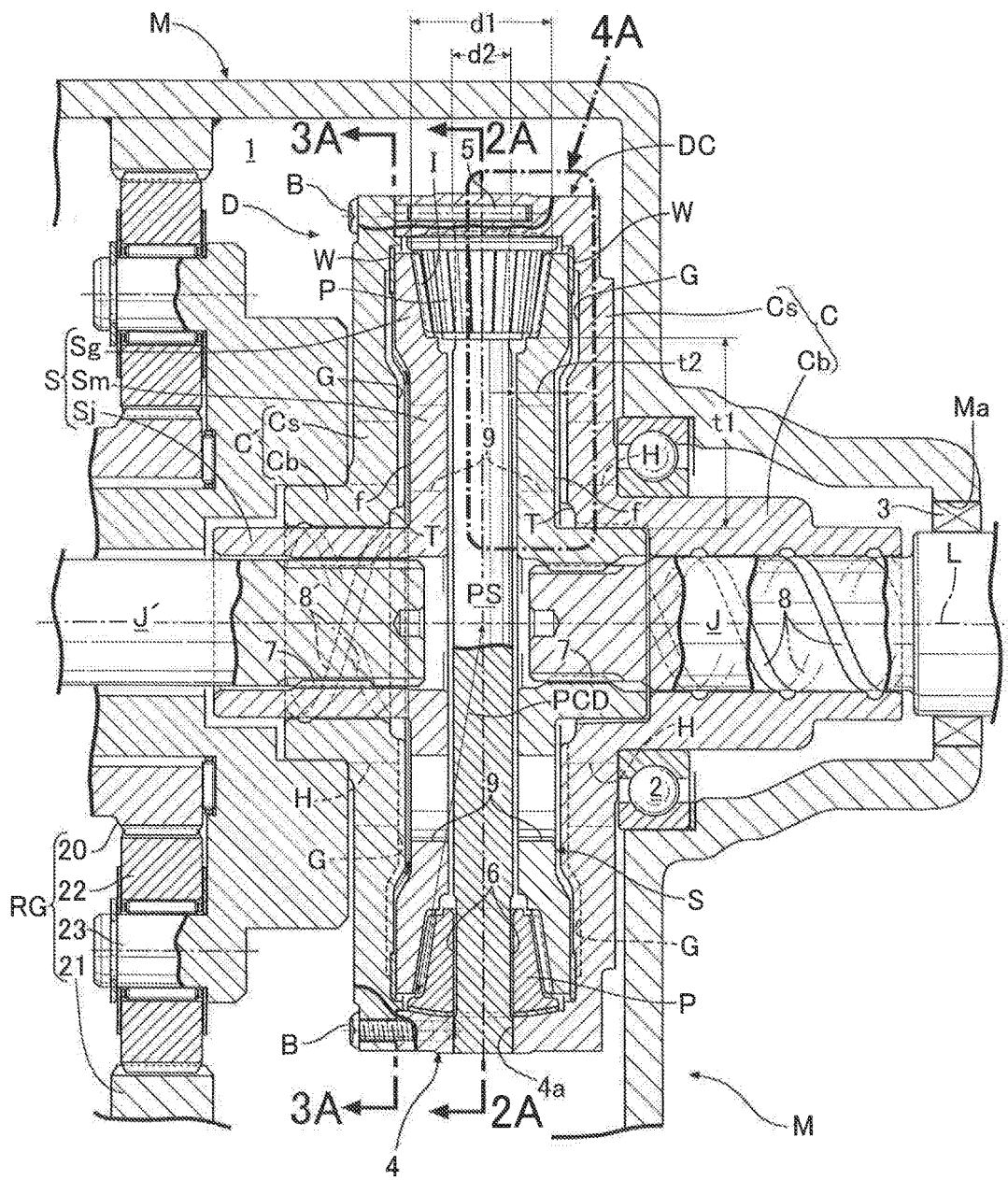
FIG. 1 is a longitudinal sectional view of a main part in a differential device and a speed reduction gear mechanism according to a first embodiment of the present invention (a sectional view taken along a 1A-1A line in FIG. 2).

First of all, referring to FIGS. 1 to 4, a first embodiment of the present invention will be described. In FIG. 1, a differential device D is connected to an engine (not illustrated) as a power source mounted on an automobile via a speed reduction gear mechanism RG. The differential device D drives a pair of axles arranged in parallel in a vehicle width direction while allowing differential rotation between the pair of axles by distributively transmitting to output shafts J, J' rotational force which is transmitted from the engine to a differential case DC via the speed reduction gear mechanism RG, the output shafts J, J' being continuous respectively to the pair of axles. The differential device D is housed together with the speed reduction gear mechanism RG in, for example, a transmission case M placed beside the engine in a front portion of a vehicle body, in a way that the differential device D is adjacent to the speed reduction gear mechanism RG. Incidentally, a power connection-disconnection mechanism and a forward-rearward travel switching mechanism (both not illustrated) which have been well-known are installed between the engine and the speed reduction gear mechanism RG. In addition, a rotation axis L of the differential case DC coincides with a center axis of the output shafts J, J'. Here, in the present specification, an "axial direction" means a direction along the center axis of the output shafts J, J' (namely, a rotation axis L of the differential case DC and side gears S). In addition, a "radial direction" means a radial direction of the differential case DC and the side gears S. Furthermore, a "back surface" means a surface on an opposite side in the axial direction of the side gears (output gears) S from pinions (differential gears) P described later.

The speed reduction gear mechanism RG is formed, for example, from a planetary gear mechanism including: a sun gear 20 which rotates in operative connection with a crankshaft of the engine; a ring gear 21 which concentrically surrounds the sun gear 20 and is fixed to an inner wall of the transmission case M; a plurality of planetary gears 22 which are installed between the sun gear 20 and the ring gear 21 and mesh with them; and a carrier 23 which rotatably and pivotally supports the planetary gears 22. Incidentally, a speed reduction gear mechanism formed from a gear train including multiple spur gears may be used instead of such a planetary gear mechanism.

The carrier 23 is rotatably supported by the transmission case M via a bearing not illustrated. Furthermore, in this embodiment, the carrier 23 is joined to one end portion (a cover portion C' described later) of the differential case DC of the differential device D so as to rotate integrally with the differential case DC. Moreover, an other end portion (a cover portion C described later) of the differential case DC is rotatably supported in the transmission case M via a bearing 2. Thus, a combination body of the differential case DC and the carrier 23 which integrally rotate together is rotatably and stably supported in the transmission case M via the plurality of bearings.

In addition, a through-hole Ma to be inserted with each of the output shafts J, J' is formed in the transmission case M. A seal member 3 having an annular shape and sealing an interstice between an inner periphery of the through-hole Ma and an outer periphery of each of the output shafts J, J' is installed therebetween. Furthermore, an oil pan (not illustrated) which faces an inner space 1 of the transmission case M and holds a predetermined amount of lubricant oil is provided in a bottom portion of the transmission case M. In the inner space 1 of the transmission case M, the lubricant oil held in the oil pan is scraped up and splashed by rotation of movable elements of the speed reduction gear mechanism RG, the differential case DC and the like toward vicinities of rotational parts. This makes it possible to lubricate the mechanical moving parts existing inside and outside the differential case DC.

Incidentally, the lubricant oil held in the oil pan may be sucked in by an oil pump (not illustrated) to be forcibly injected or sprayed toward specific parts in the inner space 1 of the transmission case M, for example toward the speed reduction gear mechanism RG and the differential case DC, or toward an inner wall of the transmission case M in peripheries of the speed reduction gear mechanism RG and the differential case DC. In addition, an outer peripheral portion of the differential case DC of the embodiment may be either partially immersed or not immersed in the lubricant oil stored in an inner bottom portion of the transmission case M.

Figure 2:
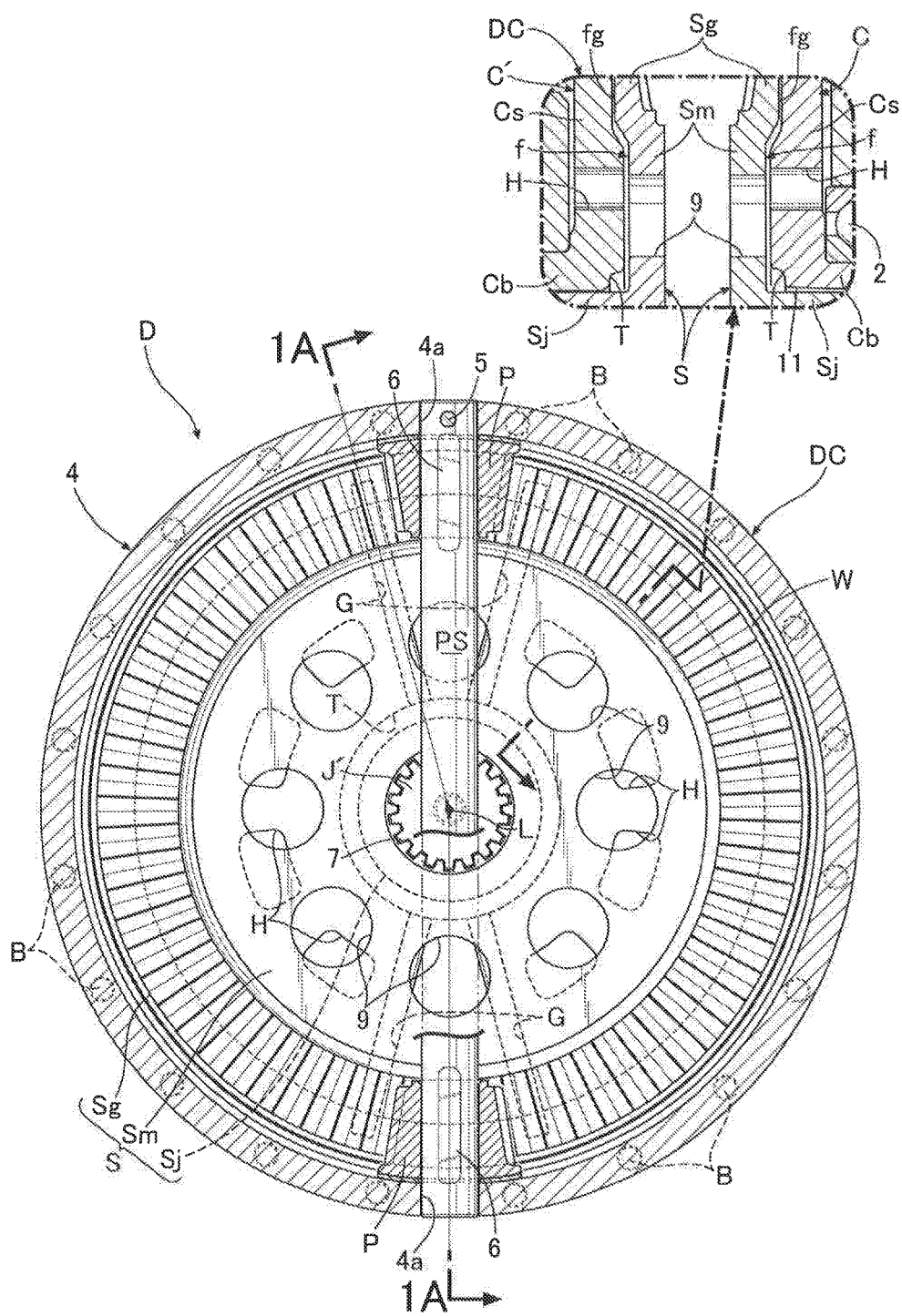
FIG. 2 is a sectional view taken along a 2A-2A line in FIG. 1.
Figure 3:
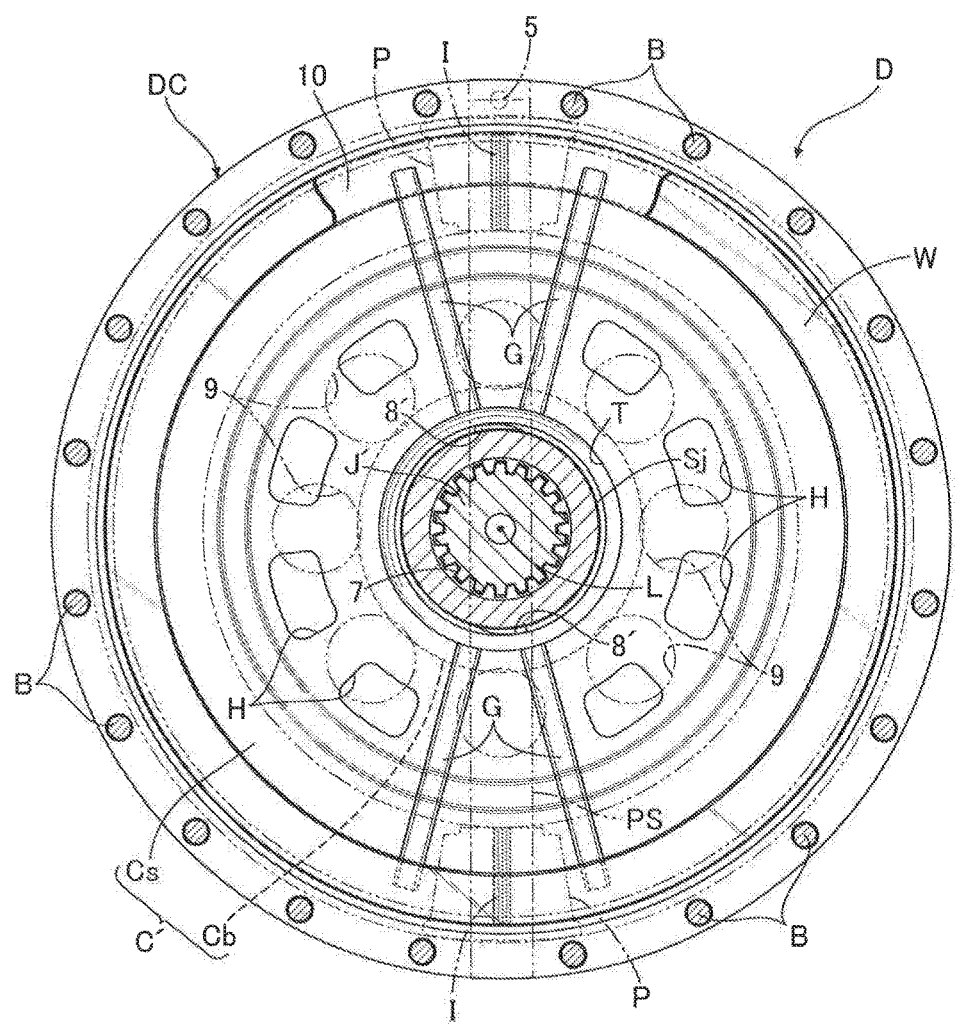
FIG. 3 is a sectional view taken along a 3A-3A line in FIG. 1.
Figure 4:
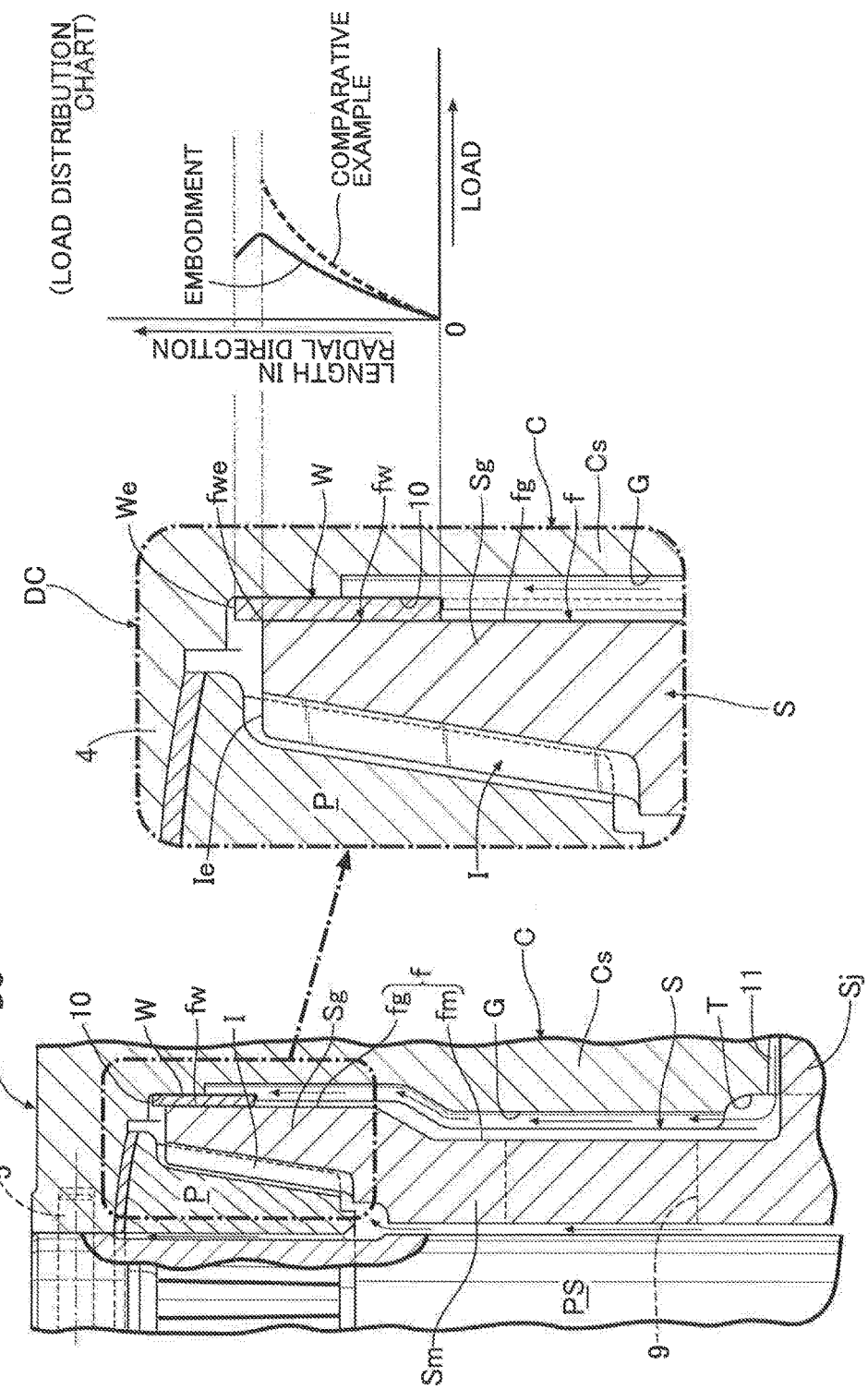
FIG. 4 shows an enlarged view of a section indicated with an arrow 4A in FIG. 1, a partially enlarged view of the enlarged view of the section indicated with the arrow 4A in FIG. 1, and a load distribution chart.

Referring to FIGS. 2 to 4 together, the differential device D includes: the differential case DC; a plurality of pinions P housed in the differential case DC; a pinion shaft PS housed in the differential case DC and rotatably supporting the pinions P; and a pair of side gears S housed in the differential case DC, meshing with the pinions P respectively from both the left and right sides and connected respectively to the pair of output shafts J, J'. In this respect, each side gear S is an example of an output gear; each pinion P is an example of a differential gear; and the differential case DC is an example of an input member. Like in well-known conventional differential devices, the each pinion P is housed and supported in the differential case DC, and is capable of rotating relative to the differential case DC and revolving around a rotation center of the differential case DC in accordance with a rotation of the differential case DC.

The differential case DC includes, for example: a case portion 4 having a short cylindrical shape (a tubular shape) and supporting the pinion shaft PS such that the case portion 4 is capable of rotating with the pinion shaft PS; and a pair of cover portions C, C' respectively covering outer sides of the pair of side gears S and rotating integrally with the case portion 4.

One of the pair of cover portions C, C', for example, the cover portion C' which is on the speed reduction gear mechanism RG side, is formed separately from the case portion 4 and detachably joined to the case portion 4 using bolts B or other appropriate joining means. Moreover, the carrier 23 of the speed reduction gear mechanism RG is joined to the cover portion C' using welding means or other appropriate joining means such that the carrier 23 can rotate integrally with the cover portion C'. In addition, the cover portion C which is the other of the pair of cover portions C, C' is integrally formed in, for example, the case portion 4 having the tubular shape. However, like the cover portion C' as one of the cover portions C, C', the cover portion C as the other of the cover portions C, C' may be formed separately from the case portion 4 and joined to the case portion 4 using the bolts B or other appropriate joining means.

Each of the cover portions C, C' includes: a boss portion Cb which concentrically surrounds a shaft portion Sj described later of the side gear S, in which the shaft portion Sj is rotatably fitted and supported and being formed in a cylindrical shape; and a side wall portion Cs formed in a plate shape and an annular shape and having an outer side surface all or most of which is a flat surface orthogonal to the rotation axis L of the differential case DC, the side wall portion Cs being integrally connected to an inner end in an axial direction of the boss portion Cb. An outer peripheral end of the side wall portion Cs is integrally or detachably connected to the case portion 4. In addition, the side wall portions Cs of the cover portions C, C' are arranged to be substantially flush with or to protrude slightly from end surfaces in the axial direction of the case portion 4. This inhibits the side wall portions Cs from protruding outward in the axial direction to a large extent, and is accordingly advantageous in making the differential device D flat in the axial direction.

Furthermore, in the side wall portion Cs of each of the cover portions C, C', a plurality of (for example, eight) through-holes H passing through so as to traverse the side wall portion Cs in the axial direction are arranged side by side at intervals in a peripheral direction. Places in which the through-holes H are formed, and the size of the through-holes H are appropriately set from a viewpoint of securing weight balance and needed rigidity strength of each of the cover portions C, C'. However, instead of or in addition to the through-holes H like this, bottomed recessed holes opened only inward may be formed in an inner side surface of the side wall portion Cs of each of the cover portions C, C'. Incidentally, the employment of the through-holes H, in particular, makes it possible to guide the lubricant oil splashed inside the transmission case M into the differential case DC via the through-holes H, and thus to more effectively lubricate sliding portions and meshing portions of the movable elements inside the differential case DC.

An outer peripheral surface of the output shaft J is relatively rotatably fitted directly to an inner peripheral surface of the boss portion Cb of the one cover portion C. A recessed groove 8 is formed in the inner peripheral surface of the boss portion Cb, the recessed groove 8 having a spiral shape and being capable of forcedly feeding the lubricant oil from an outer end to an inner end in the axial direction of the boss portion Cb in accordance with relative rotation between the output shaft J and the boss portion Cb. Meanwhile, a recessed groove 8' is formed in an inner peripheral surface of the boss portion Cb of the other cover portion C', the recessed groove 8' having a spiral shape and being capable of forcedly feeding the lubricant oil from an outer end to an inner end in the axial direction of the boss portion Cb in accordance with relative rotation between the boss portion Cb of the other cover portion C' and the shaft portion Sj of the side gear S on the same side as the other cover portion C'.

Then, the pinion shaft PS is arranged inside the differential case DC so as to be orthogonal to the rotation axis L of the differential case DC, and both end portions of the pinion shaft PS are respectively removably inserted through a pair of support through-holes 4a which are provided to the case portion 4 having the tubular shape, the support through-holes 4a being located on one diametric line of the case portion 4. In addition, the pinion shaft PS is fixed to the case portion 4 using a retaining pin 5 which penetrates through one end portion of the pinion shaft PS and is attached to the case portion 4. The retaining pin 5 is prevented from coming off the case portion 4 by abutting an outer end of the retaining pin 5 against the other cover portion C'.

Incidentally, the embodiment shows the differential device D whose pinion shaft PS is formed in a linear rod shape with the two pinions P respectively supported by both end portions of the pinion shaft PS. Instead, the differential device D may include three or more pinions P. In this case, the pinion shaft PS is formed in a shape of crossing rods such that rods extend radially from the rotation axis L of the differential case DC in three or more directions corresponding to the three or more pinions P (for example, in a shape of a cross when the differential device D includes four pinions P), and tip end portions of the pinion shaft PS support the pinions P, respectively. Furthermore, the case portion 4 is divided into a plurality of case elements such that the end portions of the pinion shaft PS can be attached to and supported in the divided case elements.

Moreover, each pinion P may be directly fitted to the pinion shaft PS, or the pinion P may be fitted to the pinion shaft PS via bearing means such as a bearing bush and the like. Incidentally, as shown in FIG. 2, the pinion shaft PS may be formed in a shape of a shaft whose diameter is substantially equal throughout its whole length, or formed in a shape of a stepped shaft. Furthermore, in each fitting surface of the pinion shaft PS, which is fitted to the pinion P, a cutout surface 6 having a flat shape (see FIG. 2) is formed to secure a sufficient flow of the lubricant oil to the fitting surface. Thus, an oil passage through which the lubricant oil can flow is secured between the cutout surface 6 and the inner peripheral surface of the pinion P.

Meanwhile, the pinions P and the side gears S are each formed as, for example, a bevel gear. In addition, each pinion P as a whole and each side gear S as a whole, including their tooth portions, are formed by plastic working such as forging and the like. For these reasons, their tooth portions with an arbitrary gear ratio can be precisely formed without restriction in machining work in the case where the tooth portions of the pinions P and the side gears S are formed by cutting work, and the like. Incidentally, as the pinions P and the side gears S, other types of gears may be used instead of the bevel gear. For example, a face gear may be used for the side gears S, while a spur gear or a helical gear may be used for the pinions P.

In addition, the pair of side gears S each include: the shaft portion Sj to which an inner end portion of the corresponding one of the pair of output shafts J, J' is spline-fitted as at 7 and being formed in a cylindrical shape; a tooth portion Sg formed in an annular shape and separated radially outward from the shaft portion Sj, the tooth portion Sg having a tooth surface in mesh with the pinions P; and an intermediate wall portion Sm formed in a flat ring plate shape extending radially outward from the inner end portion of the shaft portion Sj to an inner peripheral end portion of the tooth portion Sg. The intermediate wall portion Sm integrally connects the shaft portion Sj and the inner peripheral end portion of the tooth portion Sg. In addition, in a back surface f of each of the side gear S, a back surface portion fg of the tooth portion Sg protrudes outward in the axial direction beyond a back surface portion fm of the intermediate wall portion Sm.

Incidentally, the shaft portions Sj of the side gears S are directly and rotatably fitted in, for example, boss portions Cb of the cover portions C, C', respectively, but may be rotatably fitted in the boss portions Cb of the cover portions C, C' via bearings, respectively.

In at least one of the left and right side gear S (in the embodiment, in both the left and right side gears S), a plurality of penetrating oil passages 9 are formed at intervals in a peripheral direction in the intermediate wall portion Sm, the penetrating oil passages 9 penetrating through the intermediate wall portion Sm so as to transverse the intermediate wall portion Sm in the axial direction. Thus, inside the differential case DC, the lubricant oil smoothly flows between an inner side and an outer side of the side gear S via the penetrating oil passages 9. Incidentally, places in which the penetrating oil passages 9 are formed, and the size of the penetrating oil passages 9 are appropriately set from a viewpoint of securing weight balance and needed rigidity strength of the side gear S.

In addition, the back surface portion fg of the tooth portion Sg of the side gear S (namely, a part of the back surface f of the side gears S which is located on the back surface side of a meshing portion I between the side gear S and the pinion P) are rotatably abutted against and supported on the inner side surface of the side wall portion Cs of each of the cover portions C, C', namely, a surface of the side wall portion Cs facing the back surface f of the side gear S, via a washer W. Here, the washer W is fitted and retained in a washer retaining groove 10 formed in at least one of the inner side surface of the side wall portion Cs of each of the cover portions C, C' and a back surface of the tooth portion Sg of the corresponding side gear S (in this embodiment, the inner side surface of the side wall portion Cs).

Furthermore, an oil reserving portion T having an annular shape is formed in a recess shape in an inner peripheral end portion of the inner side surface of the side wall portion Cs of each of the cover portions C, C' (namely, the surface of the side wall portion Cs facing the back surface f of the side gear S), the oil reserving portion T facing an outer periphery of the shaft portion Sj of the side gear S. In addition, particularly the oil reserving portion T in the cover portion C communicates with an inner end in the axial direction of the recessed groove 8 in the inner peripheral surface of the boss portion Cb via a lubricant oil passage 11. The lubricant oil passage 11 is formed between facing surfaces of an inner peripheral end portion of the boss portion Cb of the cover portion C and an outer peripheral portion and an outer end surface of the shaft portion Sj of the side gear S on the cover portion C side. An outer end in the axial direction of the recessed groove 8 is open to the inner space 1 of the transmission case M. Here, the inner end in the axial direction of the recessed groove 8 also communicates with the spline-fitting portion 7 between an inner peripheral portion of the shaft portion Sj of the side gear S and an outer periphery of an inner end of the output shaft J. Thus, the spline-fitting portion 7 also can be supplied with the lubricant oil via the recessed groove 8.

Meanwhile, the oil reserving portion T in the other cover portion C' communicates with an inner end in the axial direction of the recessed groove 8' formed in the inner peripheral surface of the boss portion Cb of the other cover portion C'. An outer end in the axial direction of the recessed groove 8' communicates with the inner space 1 of the transmission case M.

Furthermore, corresponding to that the back surface portion fg of the tooth portion Sg of the side gear S protrudes further outward in the axial direction than the back surface portion fm of the intermediate wall portion Sm as described above, the inner side surface of the side wall portion Cs of each of the cover portions C, C' are formed such that a part of the side wall portion Cs corresponding to the back surface portion fm of the intermediate wall portion Sm protrudes further inward in the axial direction (is thicker in the axial direction) than a part of the side wall portion Cs corresponding to the back surface portion fg of the tooth portion Sg. This makes it possible to form the intermediate wall portions Sm of the side gears S as thin as possible while sufficiently securing support rigidity of the cover portions C, C' (accordingly, the differential case DC) with respect to the back surfaces of the tooth portions Sg of the side gears S, and therefore it is possible to achieve a further reduction in the weight of the differential device D and a further reduction in the thickness of the differential device D in the axial direction.

Moreover, in each of the cover portions C, C', a plurality of oil grooves G are formed each in a recess shape in the inner side surface of the side wall portion Cs (namely, the surface of the side wall portion Cs facing the back surface f of the corresponding side gear S), the oil grooves G extending linearly from a periphery of the shaft portion Sj of the side gear S to the back surface of the washer W. The plurality of oil grooves G are arranged offset in a peripheral direction of the side gear S from the meshing portions I between the tooth portion Sg of the side gear S and the pinions P, as shown in FIG. 3 in particular.

Particularly, the oil grooves G of the embodiment are arranged extending radially with respect to the rotation axis L of the differential case DC and each passing through between two through-holes H which are adjacent to each other in the peripheral direction of the side gear S. That is, as seen in a projection plane orthogonal to the rotation axis L of the side gear S, the oil grooves G are each arranged in a position not overlapping the pinions P in the peripheral direction. Furthermore, as seen in the projection plane orthogonal to the rotation axis L of the side gear S (FIG. 3), each pair of the oil grooves G are arranged in a V shape with the corresponding meshing portion I between the side gear S and the pinion P interposed between each pair of the oil grooves G, and also arranged near the meshing portion I. Moreover, an inner end in the radial direction of each oil groove G directly communicates with the oil reserving portion T. Incidentally, for example, each pair of the oil grooves G arranged with the meshing portion I interposed therebetween may be arranged in parallel to each other along the pinion shaft PS, instead of in the V shape as in the embodiment.

Meanwhile, as shown in FIG. 4, in the back surface f of each side gear S, an outermost peripheral end fwe of a washer abutting surface fw which abuts against the washer W is located in the same position in the radial direction of the side gear S as an outermost peripheral end Ie of the meshing portion I between the side gear S and the pinion P, and an outer peripheral end portion We of the washer W extends further radially outward than the washer abutting surface fw. Besides, in the embodiment, in each side gear S, the outermost peripheral end fwe of the washer abutting surface fw of the side gear S is a largest outer diameter portion of the side gear S.

Next, descriptions will be provided for an operation of the first embodiment. In the differential device D of this embodiment, in a case where the differential case DC receives rotational force from the engine via the speed reduction gear mechanism RG, when the pinion P revolves around the rotation axis L of the differential case DC together with the differential case DC, without rotating around the pinion shaft PS, the left and right side gears S are rotationally driven at the same speed from the differential case DC via the pinions P, and driving forces of the side gears S are evenly transmitted to the left and right output shafts J, J'. Meanwhile, when a difference in rotational speed occurs between the left and right output shafts J, J' due to turn traveling or the like of the automobile, the pinion P revolves around the rotation axis L of the differential case DC while rotating around the pinion shaft PS. Thereby, the rotational driving force is transmitted from the pinion P to the left and right side gears S while allowing differential rotations. The above is the same as the operation of the conventional differential device.

Meanwhile, in a case where the power of the engine is being transmitted to the left and right output shafts J, J' via the speed reduction gear mechanism RG and the differential device D while the automobile is, for example, travelling forward, the lubricant oil is powerfully splashed in various areas inside the transmission case M due to the rotation of the movable elements of the speed reduction gear mechanism RG and the rotation of the differential case DC. As described above, part of the splashed lubricant oil flows into the differential case DC from the plurality of through holes H. Thereafter, by centrifugal force, part of the inflowing lubricant oil flows along gaps between the side wall portions Cs of the cover portions C, C' and the back surfaces f of the side gears S toward sliding portions between the tooth portions Sg of the side gears S and the washers W, and then lubricates the sliding portions. Meanwhile, other part of the lubricant oil having flowed into the differential case DC also flows into spaces inside the side gears S via the penetrating oil passages 9 in the side gears S. Subsequently, by the centrifugal force, the inflowing part of the lubricant oil flows radially outward along inner side surfaces of the side gears S, and reaches the tooth surfaces of the tooth portions Sg of the side gears S and the meshing portions I between the tooth portions Sg of the side gears S and the pinions P, and then lubricates the meshing portions I.

Moreover, in accordance with the relative rotation between the boss portion Cb of the one cover portion C of the differential case DC and the output shaft J, part of the lubricant oil reaching a vicinity of an outer end of the boss portion Cb after splashed into the transmission case M is fed toward the inner end side in the axial direction of the boss portion Cb via the recessed groove 8 in the inner peripheral surface of the boss portion Cb, and flows from the inner end in the axial direction of the recessed groove 8 into the inner ends in the radial direction of the oil grooves G after sequentially passing through the lubricant oil passage 11 and the oil reserving portion T. Incidentally, part of the lubricant oil reaching the inner end in the axial direction of the recessed groove 8 also flows into the spline-fitting portion 7, and thereafter flows from the spline-fitting portion 7 into the inner side surface side of the side gear S.

On the other hand, in accordance with the relative rotation between the boss portion Cb of the other cover portion C' of the differential case DC and the shaft portion Sj of the corresponding side gear S, part of the lubricant oil reaching a vicinity of an outer end of the boss portion Cb after splashed into the transmission case M is fed toward the inner end in the axial direction of the boss portion Cb via the recessed groove 8' in the inner peripheral surface of the boss portion Cb, and flows from the inner end in the axial direction of the recessed groove 8' into the inner ends in the radial direction of the oil grooves G via the oil reserving portion T.

According to this embodiment, each side gear S includes the intermediate wall portion Sm having a flat ring plate shape and connecting between the shaft portion Sj on an inner peripheral side of the side gear S and the tooth portion Sg on an outer peripheral side of the side gear S, the tooth portion Sg being separated outward from the shaft portion Sj in a radial direction of the side gear S. The width t1 in the radial direction of the intermediate wall portion Sm is larger than the maximum diameter d1 of each pinion P. For these reasons, the diameter of each side gear S can be made sufficiently larger than the diameter of the pinion P, so that the number Z1 of teeth of the side gear S can be made sufficiently larger than the number Z2 of teeth of the pinion P, and it is possible to reduce load burden on the pinion shaft PS in torque transmission from the pinions P to the side gears S. Thus, it is possible to decrease the effective diameter d2 of the pinion shaft PS, and accordingly to decrease a width (diameter) of each pinion P in the axial direction of the output shafts J, J'.

Furthermore, in this manner, load burden on the pinion shaft PS is reduced, and reaction force applied to the side gears S decreases. In addition, the back surfaces f of the side gears S (particularly, the back surface portions fg located on the back surface side of the meshing portions I between the side gears S and the pinions P) are supported on the side wall portions Cs of the cover portions C, C' via the washers W. Therefore, it is easy to secure the rigidity strength needed for each of the side gears S even if the intermediate wall portion Sm is thinned. That is, it is possible to sufficiently thin the intermediate wall portion Sm of the side gear S while securing the support rigidity with respect to the side gear S. Moreover, in the embodiment, since the maximum thickness t2 of the intermediate wall portion Sm of the side gear S is formed much smaller than the effective diameter d2 of the pinion shaft PS whose diameter can be made smaller, the further thinning of the intermediate wall portion Sm of the side gear S can be achieved. Besides, since the side wall portion Cs of each of the cover portions C, C' is formed in a flat plate shape such that the outer side surface of the side wall portion Cs is the flat surface orthogonal to the rotation axis L of the differential case DC, the thinning of the side wall portion Cs itself of each of the cover portions C, C' can be achieved.

Moreover, according to the embodiment, in the back surface f of the side gear S, the back surface portion fg of the tooth portion Sg protrudes further outward in the axial direction than the back surface portion fm of the intermediate wall portion Sm. This makes it possible to form the intermediate wall portion Sm of the side gear S as thin as possible while sufficiently securing rigidity of the tooth portion Sg of the side gear S, accordingly it is possible to achieve the reduction in the weight of the differential device D and the reduction in the thickness of the differential device D in the axial direction.

As a result of these, the width of the differential device D as a whole can be sufficiently decreased in the axial direction of the output shafts J, J' while securing as approximately the same strength (for example, static torsion load strength) and as approximately the same amount of maximum torque transmission compared with the conventional differential device. This makes it possible to easily incorporate the differential device D in a transmission system, which is under many layout restrictions around the differential device D, with great freedom and no specific difficulties, and is extremely advantageous in reducing the size of the transmission system of the differential device D.

In addition, according to the embodiment, due to the centrifugal force, most of the lubricant oil flowing into the oil grooves G in the cover portions C, C' smoothly flows radially outward in the oil grooves G, and is efficiently supplied to the back surfaces of the washers W. Thus, even when large thrust reaction force acts on the washers W from the pinions P via the side gears S, it is possible to sufficiently lubricate sliding portions between the washers W and the back surfaces f of the side gears S (particularly, the back surface portions fg of the tooth portions Sg). Furthermore, each of the oil grooves G are arranged offset in the peripheral direction of the side gear S from the meshing portion I between the tooth portion Sg of the side gear S and the pinion P. Accordingly, the oil groove G can be placed in the peripheral direction out of particularly a region part acted on by large thrust reaction force in a surface of the differential case DC (namely, the side wall portions Cs of each of the cover portions C, C') facing the back surface f of the corresponding side gear S, namely the region part located on the back surface side of the meshing portion I. This inhibits a decrease in support rigidity of the region part where large load burden is applied to the differential case DC. Accordingly, an improvement in the durability of the differential case DC can be achieved.

Furthermore, according to the embodiment, the plurality of through-holes H are arranged side by side at intervals in the peripheral direction in the side wall portion Cs of each of the cover portions C, C' in the differential case DC, and each of the oil grooves G passes through between two through-holes H which are adjacent to each other. Such provision of the through-holes H advantageously makes it possible not only to achieve the reduction in the weight of the differential case DC while considering the weight balance of the differential case DC, but also to form the sufficiently long oil grooves G while avoiding the through-holes H (that is, without the through-holes H or the like obstructing the oil grooves G).

Moreover, according to the embodiment, as seen in the projection plane (FIG. 3) orthogonal to the rotation axis L of the side gear S, the washer W and the back surface portion fg, which is a part of the back surface f of the side gear S and located on the back surface side of the meshing portion I, are arranged partially overlapping each other. Thus, in the surfaces of the differential case DC (namely, the inner side surfaces of the side wall portions Cs of the side covers C, C') facing the back surfaces f of the side gears S, particularly to the region parts acted on by the large thrust reaction force in the surfaces of the differential case DC, the thrust reaction force is transmitted from the side gears S via the washers W. This makes it possible to avoid load concentration on the region parts. Thereby, it is possible to more effectively inhibit the decrease in the support rigidity of the region parts which need to bear large load burden. Accordingly, a further improvement in the durability of the differential case DC can be achieved.

Besides, according to the embodiment, the oil reserving portions T are respectively formed each in the recess shape in the inner peripheral end portions of the surfaces of the differential case DC facing the side gears S (namely, the inner peripheral end portions of the inner side surfaces of the side wall portions Cs of the cover portions C, C'), the oil reserving portions T facing the outer peripheries of the shaft portions Sj of the side gears S. This makes it possible to appropriately adjust a supply amount of the lubricant oil to the oil grooves G by using the oil reserving portions T. For example, in an initial stage of a differential operation of the differential device D, the lubricant oil can be smoothly supplied to the oil grooves G, accordingly to the washers W and the back surfaces f of the side gears S by using the lubricant oil stored in the oil reserving portions T. On the other hand, an excess of the lubricant oil can be temporarily stored in the oil reserving portions T to make the stored excess of the lubricant oil available when the supply of the lubricant oil to the oil grooves G becomes insufficient.

Moreover, according to the embodiment, the oil grooves G are arranged near the meshing portions I in the peripheral direction of the side gears S. This makes it possible to place the oil grooves G as close as possible to particularly the region parts acted on by the large thrust reaction force in the surfaces of the differential case DC facing the back surfaces f of the side gears S, namely, the region parts located on the back surface side of the meshing portions I, while placing the oil grooves G out of the region parts. Consequently, the region parts in the differential case DC which need to bear large load burden can be effectively lubricated while inhibiting the decrease in the support rigidity of the region parts as much as possible. Furthermore, since the oil grooves G like this are arranged in pair with the meshing portion I interposed each pair of the oil grooves G, the region parts which need to bear large load burden can be more effectively lubricated while inhibiting the decrease in the support rigidity of the region parts.

Further, according to this embodiment, even in a case where the tooth portions Sg of the side gears S place farther from the output shafts J, J' due to increase in the diameter of the side gears S, or even under severe driving conditions such as the high-speed rotation of the pinions P, the lubricant oil can be efficiently supplied to the meshing portions I and the sliding portions between the back surfaces f of the side gears S and the washers W. Accordingly, the seizure in the meshing portions I and the sliding portions can be prevented effectively.

Meanwhile, in the embodiment, as shown in FIG. 4, in the back surface f of each side gear S, the outermost peripheral end fwe of the washer abutting surface fw, which abuts against the washer W, in the same position in the radial direction of the side gear S as the outermost peripheral end Ie of the meshing portion I between the side gear S and the pinion P. Thus, large thrust reaction force from the pinion P via the tooth portion Sg in the outer periphery of the side gear S is less likely to concentrate excessively on an outermost peripheral end portion of the washer abutting surface fw of the side gear S, and the load burden on the tooth portion Sg itself in the outer periphery of the side gear S also decreases. Incidentally, in the present invention, the washer abutting surface fw may be set such that the outermost peripheral end fwe of the washer abutting surface fw is located outward in the radial direction of the side gear S with respect to the outermost peripheral ends Ie of the meshing portions I. Also in this case, the same effect as described above can be expected.

Moreover, the outer peripheral end portion We of the washer W extends further radially outward than the washer abutting surface fw of the side gear S. Thus, as being clear from a load distribution chart in FIG. 4, load distribution is performed on a washer receiving portion of the differential case DC (namely, a bottom portion of the washer retaining groove 10 in the side wall portion Cs of each of the cover portions C, C'). Thereby, it is possible to effectively avoid a local increase in the load burden on the washer receiving portion. Incidentally, in the load distribution chart in FIG. 4, a comparative example (indicated with a dashed line) represents a case where the outer peripheral end portion We of the washer W is not extended further radially outward than the washer abutting surface fw of the side gear S. In the comparative example, the load burden is too large on the washer receiving portion of the differential case DC which is in contact with an outermost peripheral end of the washer W.

The above-described configuration of the embodiment having the relationship among the back surfaces f of the side gears S, the washers W, and the washer receiving portions of the differential case DC can achieve reductions in the thicknesses and weights of the differential case DC (particularly, the side wall portions Cs of the cover portions C, C') and the side gears S (particularly, the tooth portions Sg in the outer peripheries of the side gears S), and can contribute to the reduction in the thickness of the differential device D in the axial direction, and the reduction in the weight of the differential device D. Moreover, since the outermost peripheral ends fwe of the washer abutting surfaces fw are the largest outer diameter portions of the side gears S, the large thrust reaction force can be appropriately distributed on and received by the washer receiving portions of the differential case DC without unnecessarily increasing the diameters of the side gears S. This makes it possible to achieve further decreases in the thicknesses and weights of the side wall portions Cs of the differential case DC and the tooth portions Sg of the side gears S.

Figure 5:
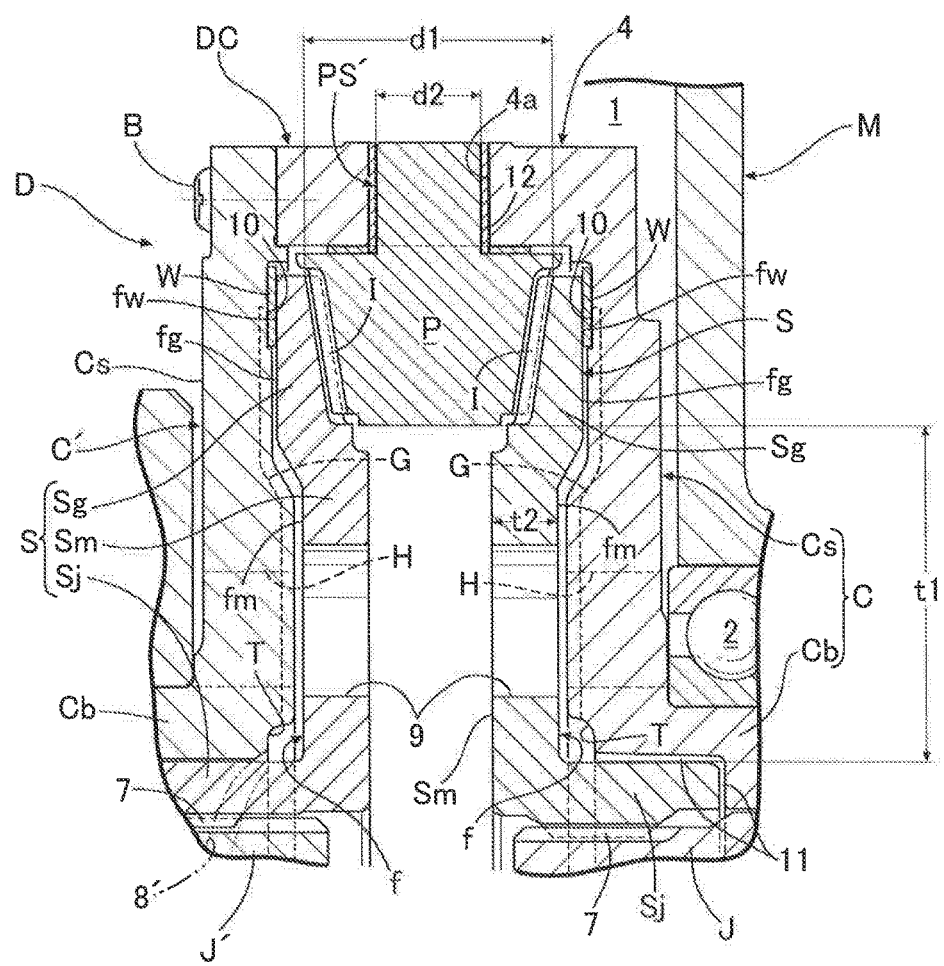
FIG. 5 is an enlarged sectional view showing a main part (meshing portions between a pinion and side gears) of a differential device according to a second embodiment of the present invention.

Next, using FIG. 5, descriptions will be provided for a second embodiment of the present invention. Incidentally, constituent components which are the same as those of the first embodiment will be denoted by the same reference signs, and detailed descriptions for such constituent components will be omitted.

Although the first embodiment has shown the differential device which uses the long pinion shaft PS as the support portion supporting the pinions P (that is, a differential gear support portion), this second embodiment shows a differential device which is configured such that the support portion supporting the pinions P (that is, the differential gear support portion) is formed from a support shaft PS' coaxially and integrally connected to a large diameter-side end surface of the pinion P. According to this configuration, it is unnecessary to provide in the pinion P the through-hole fitted with the pinion shaft PS, and thus it is possible to reduce the diameter (the width in the axial direction) of the pinion P by an amount corresponding to the through-hole. Thereby, the differential device D can be further thinned in the axial direction of the output shafts J, J'. In other words, in a case where the pinion shaft PS penetrates through the pinion P, it is necessary to form in the pinion P the through-hole in a size corresponding to the diameter of the pinion shaft PS. In contrast, in a case where the support shaft PS' integrated with the end surface of the pinion P, it is possible to reduce the diameter of the pinion P (the width of the pinion P in the axial direction of the output shafts J, J') without depending on an outer diameter (that is, the effective diameter d2) of the support shaft PS'.

Furthermore, as bearing means, a bearing bush 12 is installed between an outer peripheral surface of the support shaft PS' and an inner peripheral surface of a corresponding support through-hole 4a provided to the outer peripheral wall, that is, the case portion 4 having the tubular shape, of the differential case DC. The bearing bush 12 is configured to allow relative rotation between the outer peripheral surface of the support shaft PS' and the inner peripheral surface of the support through-hole 4a. Incidentally, a bearing such as a needle bearing and the like may be used as the bearing means. Otherwise, the bearing may be omitted so that the support shaft PS' is directly fitted in the support through-hole 4a of the differential case DC.

The second embodiment of the present invention except for the above descriptions can achieve the substantially same effect as that of the first embodiment.

Figure 6:
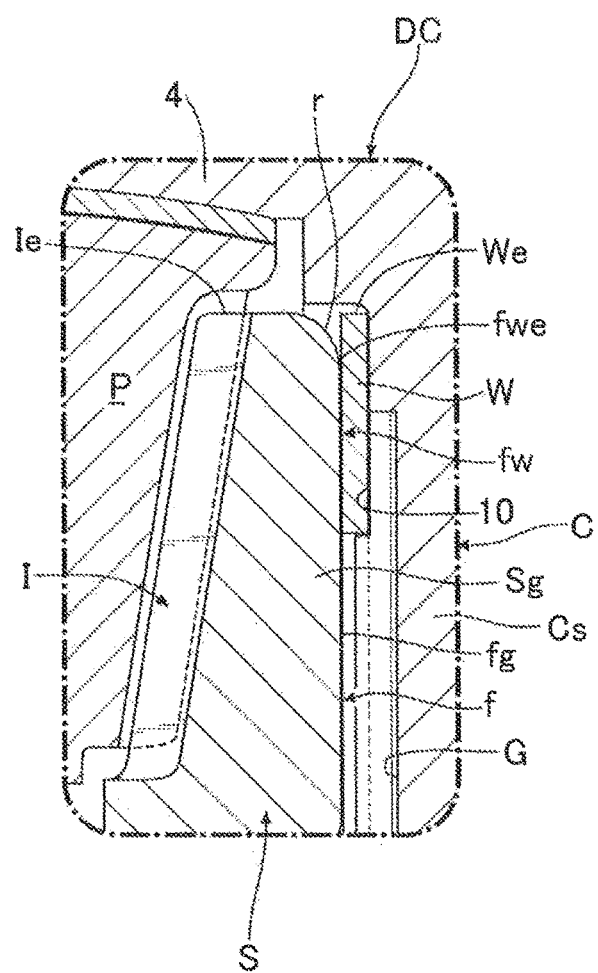
FIG. 6 is an enlarged sectional view (a sectional view corresponding to the partially enlarged view in FIG. 4) showing a main part of a differential device according to a third embodiment of the present invention.

Next, using FIG. 6, descriptions will be provided for a third embodiment of the present invention. In the first and second embodiments, the outermost peripheral end fwe of the washer abutting surface fw, which abuts against the washer W, of the back surface f of the side gear S is located in the same position as or further outward in the radial direction of the side gear S than, the outermost peripheral ends Ie of the meshing portion I between the side gear S and the pinion P, and the outermost peripheral end fwe of the washer abutting surface fw is the largest outer diameter portion of the side gear S. However, in the third embodiment, a rounded portion r having an arc shape in a cross section smoothly connects between an outer peripheral end surface of the tooth portion Sg of the side gear S and the back surface of the tooth portion Sg (particularly, the washer abutting surface fw) of the side gear S. Thus, the outermost peripheral end fwe of the washer abutting surface fw is located further radially inward than the largest outer diameter portion of the side gear S (namely, the outer peripheral end surface). Like in the first and second embodiments, however, the outer peripheral end portion We of the washer W extends further radially outward than the washer abutting surface fw, and the washer abutting surface fw is located on the back surface side of the meshing portion I.

The other configuration of the third embodiment is the same as that of the first embodiment, and therefore the constituent components will be denoted by the same reference sings of the corresponding constituent components of the first embodiment, and duplicated descriptions for such constituent components will be omitted.

Accordingly, also in the third embodiment, it is possible to achieve the substantially same effect as the first and second embodiments. Incidentally, in the third embodiment, in the side gear S, the outer peripheral end surface of the tooth portion Sg and the back surface of the tooth portion Sg (particularly, the washer abutting surface fw) may be connected together by a flat taper surface having a straight line shape in a cross section, instead of the rounded portion r.

Meanwhile, in the conventional differential devices (particularly, the conventional differential devices each including a pinion (differential gear) inside an input member, and a pair of side gears (output gears) meshing with the pinion (differential gear)) exemplified in Japanese Patent No. 4803871 and Japanese Patent Application KOKAI Publication No. 2002-364728, the number Z1 of teeth of the side gear (output gear) and the number Z2 of teeth of the pinion (differential gear) are generally set at 14 and 10, 16 and 10, or 13 and 9, respectively, as shown in Japanese Patent Application KOKAI Publication No. 2002-364728, for example. In these cases, the number-of-teeth ratios Z1/Z2 of the output gears to the differential gears are 1.4, 1.6 and 1.44, respectively. In addition, other publicly-known examples of the combination of the number Z1 of teeth and the number Z2 of teeth for conventional differential devices include 15 and 10, 17 and 10, 18 and 10, 19 and 10, and 20 and 10. In these cases, the number-of-teeth ratios Z1/Z2 are at 1.5, 1.7, 1.8, 1.9 and 2.0, respectively.

On the other hand, nowadays, there is an increase in the number of transmission systems which are under layout restrictions around their respective differential devices. Accordingly, the market demands that differential devices be sufficiently reduced in width (i.e., thinned) in the axial direction of their output shafts while securing the gear strength for the differential devices. However, the structural forms of the conventional existing differential devices are wide in the axial direction of the output shafts, as apparent from the gear combinations leading to the above-mentioned number-of-teeth ratios. This makes it difficult to satisfy the market demand.

With this taken into consideration, an attempt to find a concrete configuration example of the differential device D which can be sufficiently reduced in width (i.e., thinned) in the axial direction of the output shafts while securing the gear strength for the differential device has been made as follows, from a viewpoint different from that of the foregoing embodiments. Incidentally, the structures of the components of the differential device D of this configuration example are the same as the structures of the components of the differential device D of the foregoing embodiments which have been described using FIGS. 1 to 6 (particularly, FIGS. 1 to 4 and FIG. 6). For this reason, the components of the configuration example will be denoted with the same reference signs as those of the embodiments, and descriptions for the structures will be omitted.

Figure 7:
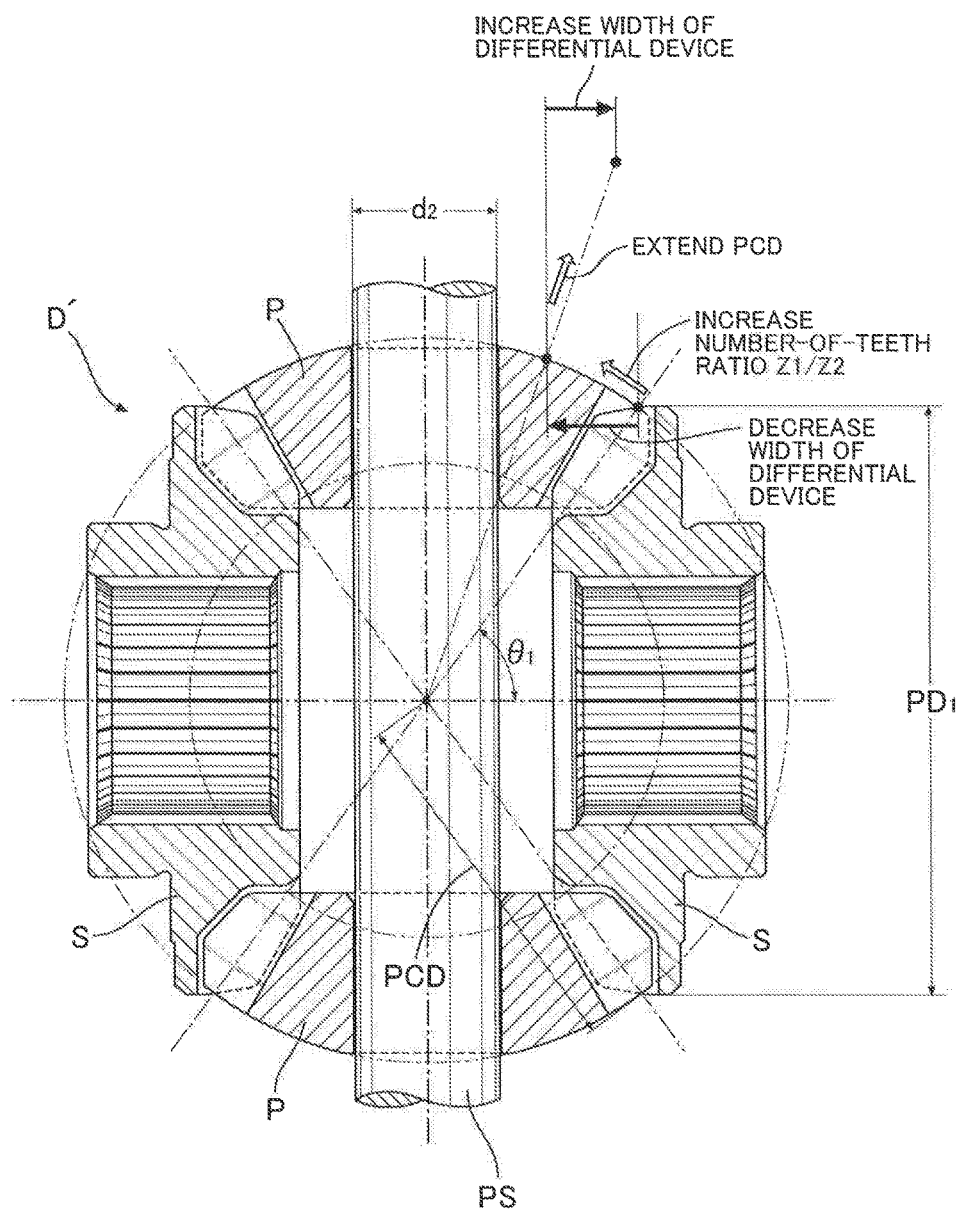
FIG. 7 is a longitudinal sectional view showing an example of a conventional differential device.

To begin with, let us explain a basic concept for sufficiently reducing the width of (i.e., thinning) the differential device D in the axial direction of the output shafts J, J' referring to FIG. 7 together. The concept is as follows.
Approach [1] To make the number-of-teeth ratio Z1/Z2 of the side gear S, that is, the output gear to the pinion P, that is, the differential gear larger than the number-of-teeth ratio used for the conventional existing differential device. (This leads to a decrease in the module (accordingly the tooth thickness) of the gear and a resultant decrease in the gear strength, while leading to an increase in the pitch circle diameter of the side gear S, a resultant decrease in transmission load in the meshing portion of the gear, and a resultant increase in the gear strength. However, the gear strength as a whole decreases, as discussed below.)
Approach [2] To make the pitch cone distance PCD of the pinion P larger than the pitch cone distance in the conventional existing differential device. (This leads to an increase in the module of the gear and a resultant increase in the gear strength, while leading to an increase in the pitch circle diameter of the side gear S, a resultant decrease in the transmission load in the meshing portion of the gear, and a resultant increase in the gear strength. Thus, the gear strength as a whole increases greatly, as discussed below.)

For these reasons, when the number-of-teeth ratio Z1/Z2 and the pitch cone distance PCD are set such that the amount of decrease in the gear strength based on Approach [1] is equal to the amount of increase in the gear strength based on Approach [2] or such that the amount of increase in the gear strength based on Approach [2] is greater than the amount of decrease in the gear strength based on Approach [1], the gear strength as a whole can be made equal to or greater than that of the conventional existing differential device.

Next, let us concretely examine how the gear strength changes based on Approaches [1] and [2] using mathematical expressions. Incidentally, the examination will be described in the following embodiment. First of all, a "reference differential device" is defined as a differential device D' in which the number Z1 of teeth of the side gear S is set at 14 while the number Z2 of teeth of the pinion P is set at 10. In addition, for each variable, a "change rate" is defined as a rate of change in the variable in comparison with the corresponding base number (i.e., 100%) of the reference differential device D'.

Approach [1]

When $MO$, $PD_1$, $\theta_1$, $PCD$, $FO$, and $TO$ respectively denote the module, pitch circle diameter, pitch angle, pitch cone distance, transmission load in the gear meshing portion, and transmission torque in the gear meshing portion, of the side gear S, general formulae concerning the bevel gear provide $MO = PD_1/Z1$, $PD_1 = 2PCD \cdot \sin \theta_1$, and $\theta_1 = \tan^{-1}(Z1/Z2)$.

From these expressions, the module of the gear is expressed with $$MO = 2PCD \cdot \sin \{\tan^{-1}(Z1/Z2)\}/Z1 \quad (1)$$

Meanwhile, the module of the reference differential device D' is expressed with $2PCD \cdot \sin \{\tan^{-1}(7/5)\}/14$.

Dividing the term on the right side of Expression (1) by $2PCD \cdot \sin \{\tan^{-1}(7/5)\}/14$ yields a module change rate with respect to the reference differential device D', which is expressed with Expression (2) given below.

$$\text{Module Change Rate} = \frac{14 \cdot \sin\left(\tan^{-1}\frac{z1}{z2}\right)}{z1 \cdot \sin\left(\tan^{-1}\frac{7}{5}\right)} \quad (2)$$

In addition, the section modulus of the tooth portion corresponding to the gear strength (i.e., the bending strength of the tooth portion) is in proportion to the square of the tooth thickness, while the tooth thickness has a substantially linear relationship with the module MO. For these reasons, the square of the module change rate corresponds to a rate of change in the section modulus of the tooth portion, accordingly a gear strength change rate. In other words, based on Expression (2) given above, the gear strength change rate is expressed with Expression (3) given below. Expression (3) is represented by a line L1 in FIG. 8 when the number Z2 of teeth of the pinion P is 10. From the line L1, it is learned that as the number-of-teeth ratio Z1/Z2 becomes larger, the module becomes smaller and the gear strength accordingly becomes lower.

$$\text{Gear Strength Change Rate} = (\text{Module Change Rate})^2 \quad (3)$$

$$= \frac{196 \cdot \sin^2\left(\tan^{-1}\frac{z1}{z2}\right)}{z1^2 \cdot \sin^2\left(\tan^{-1}\frac{7}{5}\right)}$$

Meanwhile, based on the general formulae concerning the bevel gear, a torque transmission distance of the side gear S is expressed with Expression (4) given below.

$$PD_1/2 = PCD \cdot \sin \{\tan^{-1}(Z1/Z2)\} \quad (4)$$

From the torque transmission distance $PD_1/2$, the transmission load FO is given as $FO = 2TO/PD_1$.

For this reason, when the torque TO of the side gear S of the reference differential device D' is constant, the transmission load FO is in inverse proportion to the pitch circle diameter $PD_1$. In addition, the rate of change in the transmission load FO is in inverse proportion to the gear strength change rate. For this reason, the gear strength change rate is equal to the rate of change in the pitch circle diameter $PD_1$.

As a result, using Expression (4), the rate of change in the pitch circle diameter $PD_1$ is expressed with Expression (5) given below.

$$\text{Gear Strength Change Rate} = PD_1 \text{ Change Rate} \quad (5)$$

$$= \frac{\sin\left(\tan^{-1}\frac{z1}{z2}\right)}{\sin\left(\tan^{-1}\frac{7}{5}\right)}$$

Figure 8:
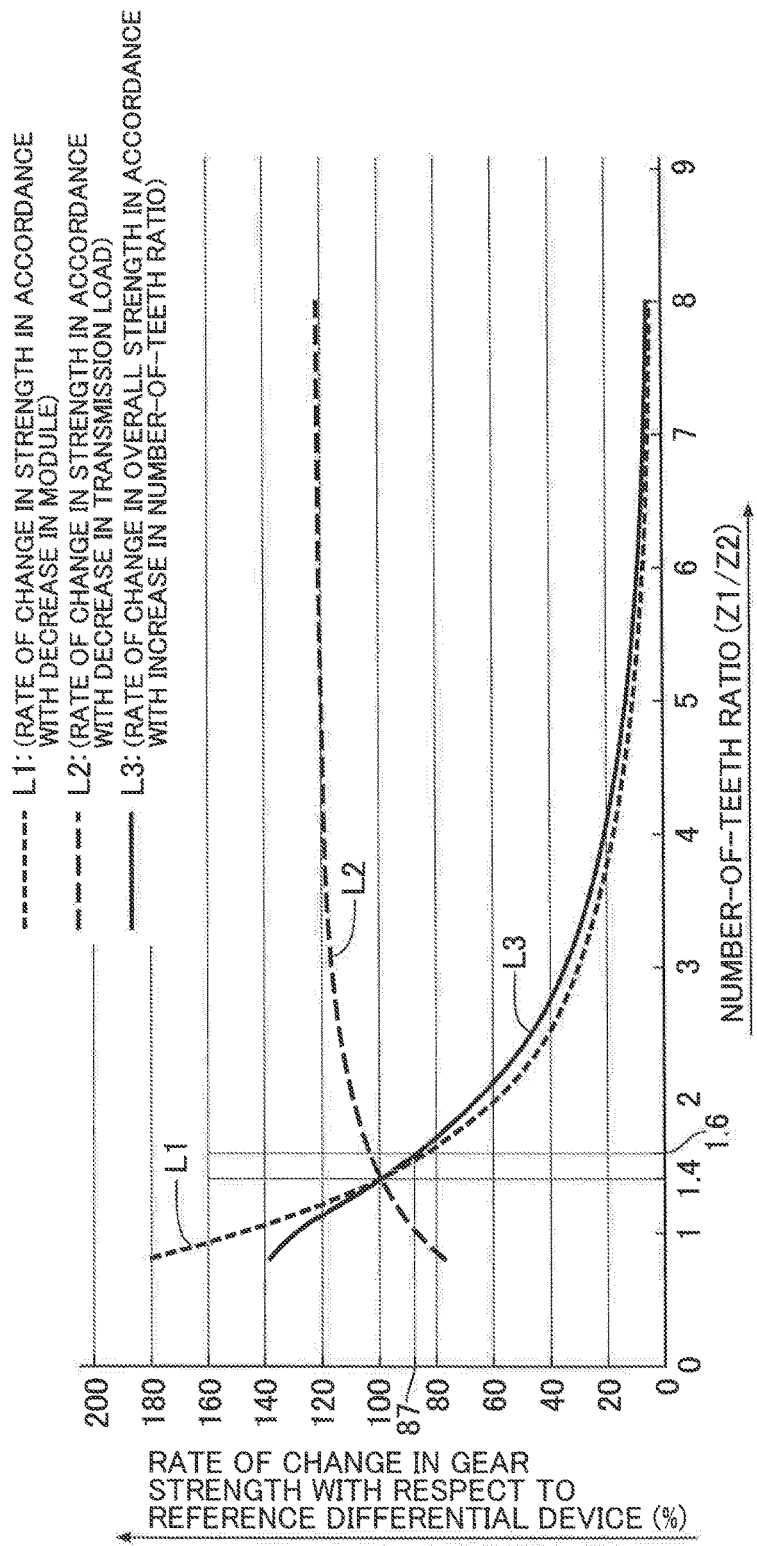
FIG. 8 is a graph showing a relationship of gear strength change rates with a number-of-teeth ratio where the number of teeth of the pinion is set at 10.

Expression (5) is represented by a line L2 in FIG. 8 when the number Z2 of teeth of the pinion P is 10. From the line L2, it is learned that as the number-of-teeth ratio Z1/Z2 becomes larger, the transmission load becomes smaller, and the gear strength accordingly becomes stronger.

Eventually, the gear strength change rate in accordance with the increase in the number-of-teeth ratio Z1/Z2 is expressed with Expression (6) given below by multiplying a rate of decrease change in the gear strength in accordance with the decrease in the module MO (the term on the right side of Expression (3) shown above) and a rate of increase change in the gear strength in accordance with the decrease in the transmission load (the term on the right side of Expression (5) shown above).

$$\text{Gear Strength Change Rate in Accordance with Number-of-Teeth Ratio} = \frac{196 \cdot \sin^3\left(\tan^{-1}\frac{z1}{z2}\right)}{z1^2 \cdot \sin^3\left(\tan^{-1}\frac{7}{5}\right)} \quad (6)$$

Expression (6) is represented by a line L3 in FIG. 8 when the number Z2 of teeth of the pinion P is 10. From the line L3, it is learned that as the number-of-teeth ratio Z1/Z2 becomes larger, the gear strength as a whole becomes lower.
Approach [2]

In a case of increasing the pitch cone distance PCD of the pinion P more than the pitch cone distance in the reference differential device D', when PCD1, PCD2 respectively denote the pitch cone distance PCD before the change and the pitch cone distance PCD after the change, the module change rate in accordance with the change in the pitch cone distance PCD is expressed with $$PCD2/PCD1$$

if the number of teeth is constant, based on the above-mentioned general formulae concerning the bevel gear.

Meanwhile, as being clear from the above-discussed process for deriving Expression (3), the gear strength change rate of the side gear S corresponds to the square of the module change rate. For this reason, $$\text{Gear Strength Change Rage in Accordance with Increase in Module} = (PCD2/PCD1)^2 \quad (7)$$

is obtained. Expression (7) is represented by a line L4 in FIG. 9. From the line L4, it is learned that as the pitch cone distance PCD becomes larger, the module becomes larger, and the gear strength accordingly becomes stronger.

In addition, when the pitch cone distance PCD is made larger than the pitch cone distance PCD1 in the reference differential device D', the transmission load FO decreases. Thereby, the gear strength change rate becomes equal to the rate of change in the pitch circle diameter PD$_1$, as described above. In addition, the pitch circle diameter PD$_1$ of the side gear S is in proportion to the pitch cone distance PCD. For these reasons, $$\text{Gear Strength Change Rate in Accordance with Decrease in Transmission Load} = PCD2/PCD1 \quad (8)$$

is obtained.

Figure 9:
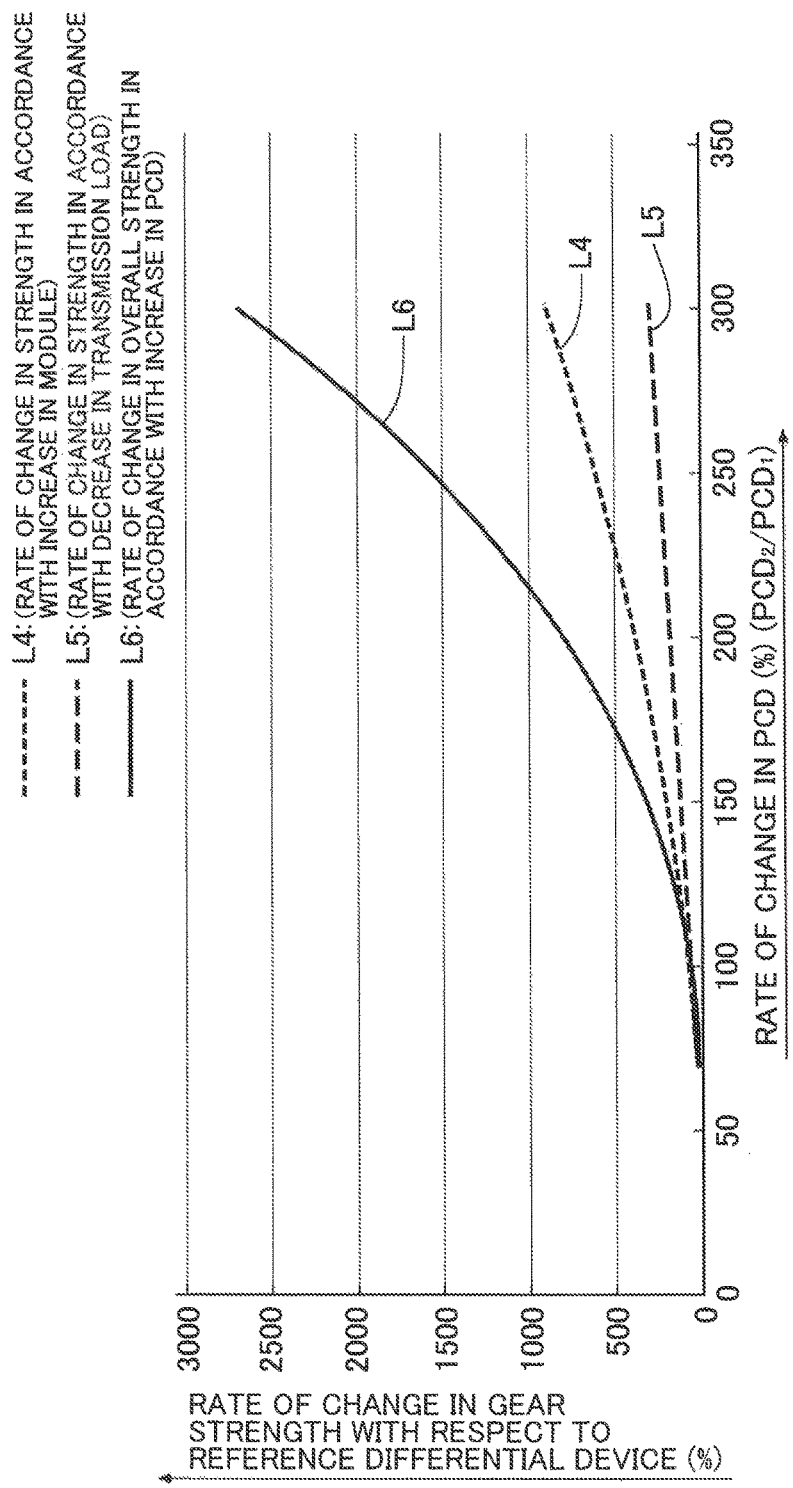
FIG. 9 is a graph showing a relationship of the gear strength change rates with a pitch cone distance change rate.

Expression (8) is represented by a line L5 in FIG. 9. From the line L5, it is learned that as the pitch cone distance PCD becomes larger, the transmission load becomes lower, and the gear strength accordingly becomes stronger.

In addition, the gear strength change rate in accordance with the increase in the pitch cone distance PCD is expressed with Expression (9) given below by multiplying the rate of increase change in the gear strength in accordance with the increase in the module MO (the term on the right side of Expression (7) shown above) and the rate of increase change in the gear strength in accordance with the decrease in the transmission load in response to the increase in the pitch circle diameter PD (the term on the right side of Expression (8) shown above).

$$\text{Gear Strength Change Rate in Accordance with Increase in Pitch Cone Distance} = (PCD2/PCD1)^3 \quad (9)$$

Expression (9) is represented by a line L6 in FIG. 9. From the line L6, it is learned that as the pitch cone distance PCD becomes larger, the gear strength is increased greatly.

With these taken into consideration, the combination of the number-of-teeth ratio Z1/Z2 and the pitch cone distance PCD is determined such that: the decrease in the gear strength based on Approach [1] given above (the increase in the number-of-teeth ratio) is sufficiently compensated for by the increase in the gear strength based on Approach [2] given above (the increase in the pitch cone distance) so as to make the overall gear strength of the differential device equal to or greater than the gear strength of the conventional existing differential device.

For example, 100% of the gear strength of the side gear S of the reference differential device D' can be kept by setting the gear strength change rate in accordance with the increase in the number-of-teeth ratio (i.e., the term on the right side of Expression (6) given above) obtained based on Approach [1] given above and the gear strength change rate in accordance with the increase in the pitch cone distance (i.e., the term on the right side of Expression (9) given above) obtained based on Approach [2] given above, such that the multiplication of these gear strength change rates becomes equal to 100%. Thereby, the relationship between the number-of-teeth ratio Z1/Z2 and the rate of change in the pitch cone distance PCD for keeping 100% of the gear strength of the reference differential device D' can be obtained from Expression (10) given below. Expression (10) is represented by a line L7 in FIG. 10 when the number Z2 of teeth of the pinion P is 10.

$$PCD2/PCD1 = \left(100\% \bigg/ \begin{array}{c}\text{Gear Strength Change}\\ \text{Rate in Accordance with}\\ \text{Number-of-Teeth Ratio}\end{array}\right)^{\frac{1}{3}} \quad (10)$$

$$= \left\{\frac{1}{\frac{196 \cdot \sin^3\left(\tan^{-1}\frac{z1}{z2}\right)}{z1^2 \cdot \sin^3\left(\tan^{-1}\frac{7}{5}\right)}}\right\}^{\frac{1}{3}}$$

$$= \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Figure 10:
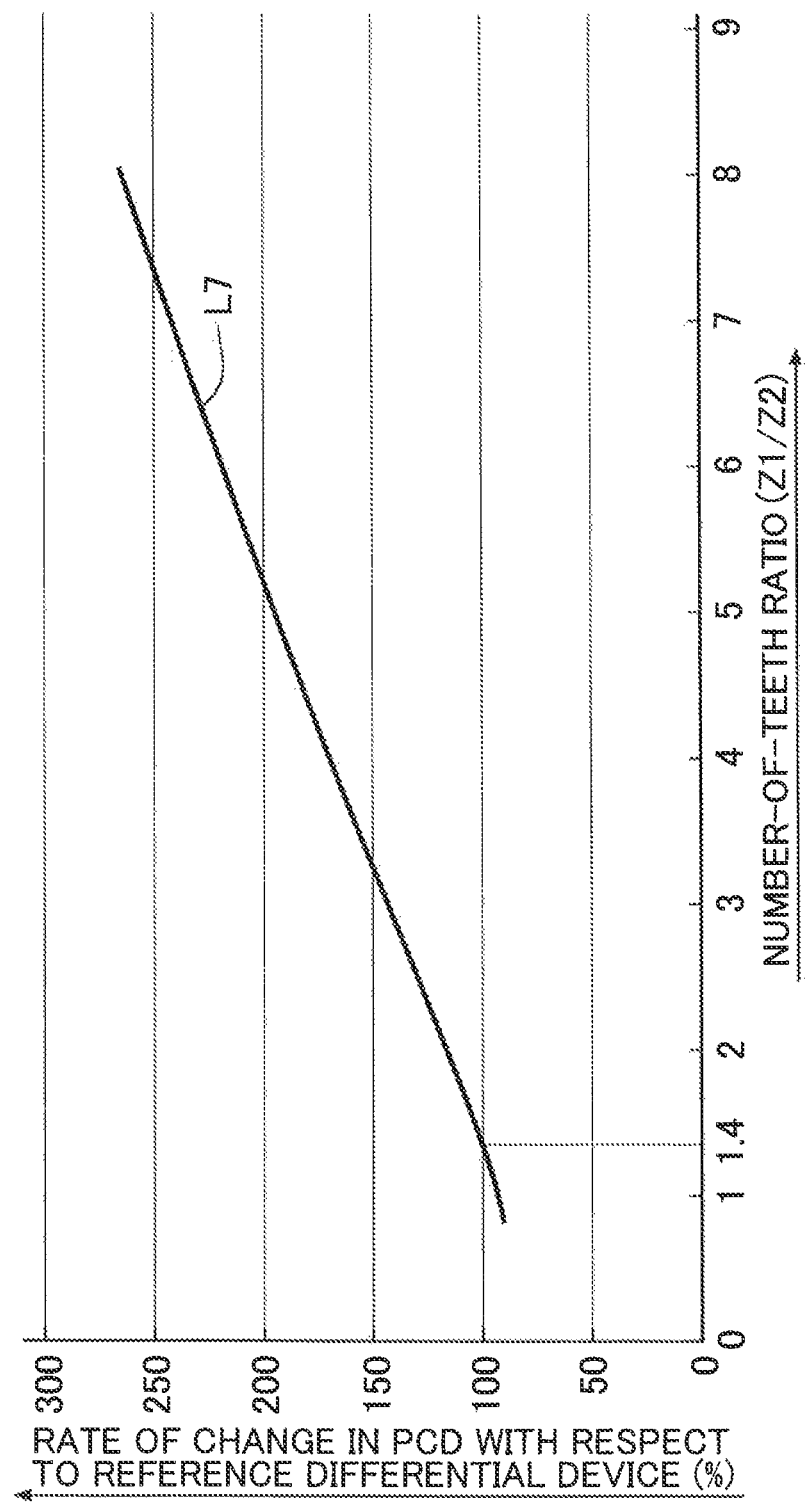
FIG. 10 is a graph showing a relationship of the pitch cone distance change rate with the number-of-teeth ratio for keeping 100% of the gear strength where the number of teeth of the pinion is set at 10.

Like this, Expression (10) represents the relationship between the number-of-teeth ratio Z1/Z2 and the rate of change in the pitch cone distance PCD for keeping 100% of the gear strength of the reference differential device D' when the number-of-teeth ratio Z1/Z2 is equal to 14/10 (see FIG. 10). The rate of change in the pitch cone distance PCD represented by the vertical axis in FIG. 10 can be converted into a ratio of d2/PCD where d2 denotes a shaft diameter of the pinion shaft PS (i.e., the pinion support portion) supporting the pinion P.

TABLE 1

| PCD | SHAFT DIAMETER (d2) | d2/PCD |
|---|---|---|
| 31 | 13 | 42% |
| 35 | 15 | 43% |
| 38 | 17 | 45% |
| 39 | 17 | 44% |
| 41 | 18 | 44% |
| 45 | 18 | 40% |

To put it concretely, in the conventional existing differential device, the increase change in the pitch cone distance PCD correlates with the increase change in the shaft diameter d2 as shown in Table 1, and can be represented by a decrease in the ratio of d2/PCD when d2 is constant. In addition, in the conventional existing differential device, d2/PCD falls within a range of 40% to 45% as shown in Table 1 given above when the conventional existing differential device is the reference differential device D', and the gear strength increases as the pitch cone distance PCD increases. Judging from these, the gear strength of the differential device can be made equal to or greater than the gear strength of the conventional existing differential device by determining the shaft diameter d2 of the pinion shaft PS and the pitch cone distance PCD such that at least d2/PCD is equal to or less than 45%, when the differential device is the reference differential device D'. In other words, when the differential device is the reference differential device D', it suffices if d2/PCD≤0.45 is satisfied. In this case, when PCD2 denotes the pitch cone distance PCD which is changed to become larger or less than the pitch cone distance PCD1 of the reference differential device D', it suffices if $$d2/PCD2 < 0.45/(PCD2/PCD1) \quad (11)$$

is satisfied. Furthermore, the application of Expression (11) to Expression (10) given above can convert the relationship between d2/PCD and the number-of-teeth ratio Z1/Z2 into Expression (12) given below.

$$d2/PCD \leq 0.45/(PCD2/PCD1) \quad (12)$$

$$= 0.45 \bigg/ \left\{ \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\}$$

$$= 0.45 \cdot \left(\frac{14}{z1}\right)^{\frac{2}{3}} \cdot \frac{\sin\left(\tan^{-1}\frac{z1}{z2}\right)}{\sin\left(\tan^{-1}\frac{7}{5}\right)}$$

Figure 11:
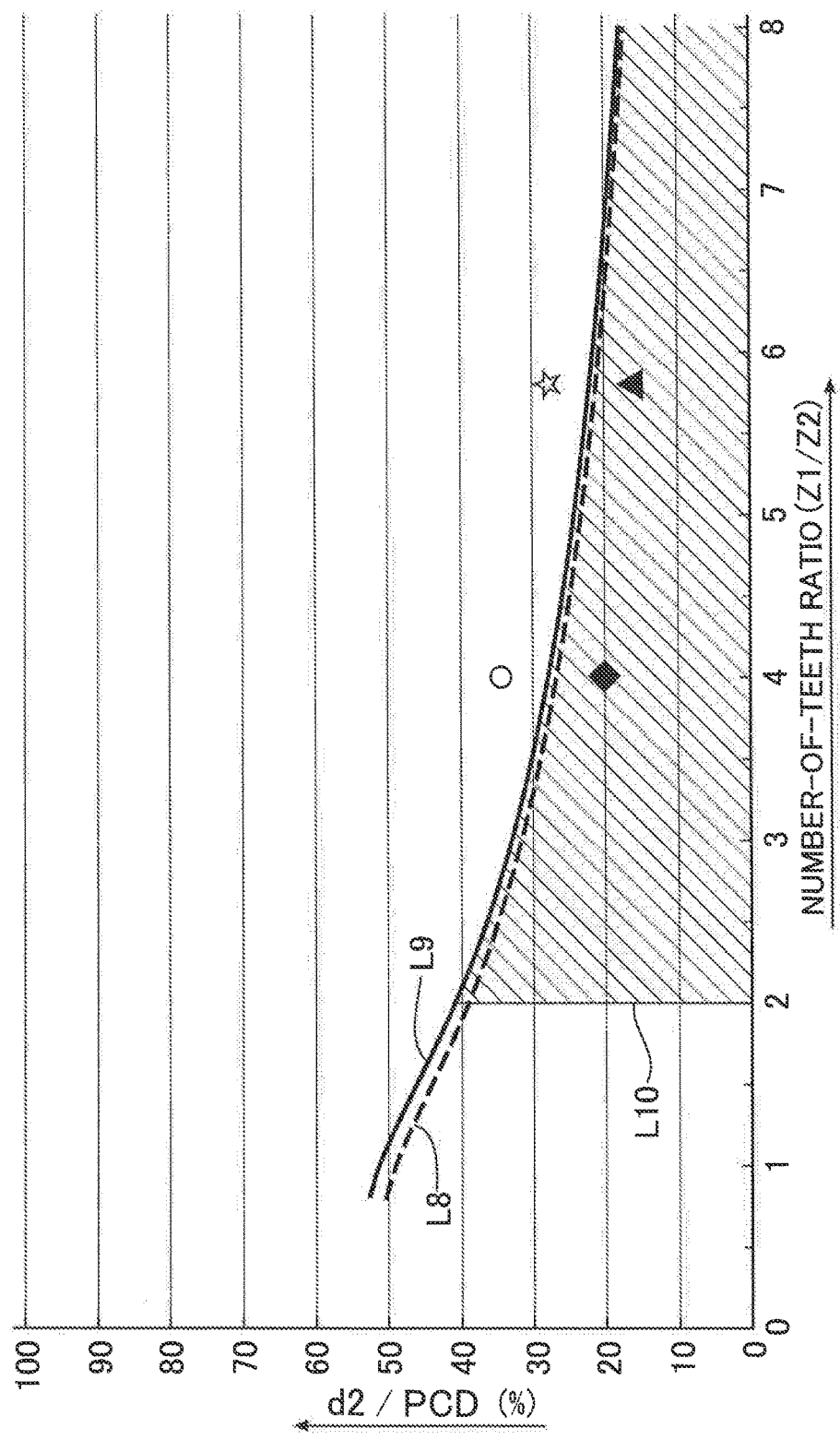
FIG. 11 is a graph showing a relationship between a shaft diameter/pitch cone distance ratio and the number-of-teeth ratio where the number of teeth of the pinion is set at 10.

When the Expression (12) is equal, Expression (12) can be represented by a line L8 in FIG. 11 if the number Z2 of teeth of the pinion P is 10. When the Expression (12) is equal, the relationship between d2/PCD and the number-of-teeth ratio Z1/Z2 keeps 100% of the gear strength of the reference differential device D'.

Meanwhile, in conventional existing differential devices, usually, not only the number-of-teeth ratio Z1/Z2 equal to 1.4 used above to explain the reference differential device D' but also the number-of-teeth ratio Z1/Z2 equal to 1.6 or 1.44 is adopted. This needs to be taken into consideration. Based on the assumption that the reference differential device D' (Z1/Z2=1.4) guarantee the necessary and sufficient gear strength, that is, 100% of gear strength, it is learned, as being clear from FIG. 8, that the gear strength of conventional existing differential devices in which the number-of-teeth ratio Z1/Z2 is 16/10 is as low as 87% of the gear strength of the reference differential device D'. The general practice, however, is that the gear strength low at that level is accepted as practical strength and actually used for conventional existing differential devices. Judging from this, one may consider that gear strength which needs to be sufficiently secured for and is acceptable for the differential device which is thinned in the axial direction is at least equal to, or greater than, 87% of the gear strength of the reference differential device D'.

From the above viewpoint, first, a relationship for keeping 87% of the gear strength of the reference differential device D' is obtained between the number-of-teeth ratio Z1/Z2 and the rate of change in the pitch cone distance PCD. The relationship can be expressed with Expression (10') given below by performing a calculation by emulating the process of deriving Expression (10) given above (i.e., a calculation such that the multiplication of the gear strength change rate in accordance with the increase in the number-of-teeth ratio (i.e., the term on the right side of Expression (6) given above) and the gear strength change rate in accordance with the increase in the pitch cone distance (i.e., the term on the right side of Expression (9) given above) becomes equal to 87%).

$$PCD2/PCD1 = \left( 87\% \bigg/ \begin{array}{c} \text{Gear Strength Change} \\ \text{Rate in Accordance with} \\ \text{Number-of-Teeth Ratio} \end{array} \right)^{\frac{1}{3}} \quad (10')$$

$$= \left\{ \frac{0.87}{\frac{196 \cdot \sin^3\left(\tan^{-1}\frac{z1}{z2}\right)}{z1^2 \cdot \sin^3\left(\tan^{-1}\frac{7}{5}\right)}} \right\}^{\frac{1}{3}}$$

$$= 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Thereafter, when Expression (11) given above is applied to Expression (10') given above, the relationship between d2/PCD and the number-of-teeth ratio Z1/Z2 for keeping 87% or more of the gear strength of the reference differential device D' can be converted into Expression (13) given below. However, the calculation is performed using the following rules that: the number of significant figures is three for all the factors, except for factors expressed with variables; digits below the third significant figure are rounded down; and although the result of the calculation cannot avoid approximation by an calculation error, the mathematical expression uses the equals sign because the error is negligible.

$$d2/PCD \leq 0.45 \bigg/ \left\{ 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\} \quad (13)$$

$$= 3.36 \cdot \left(\frac{1}{z1}\right)^{\frac{2}{3}} \cdot \sin\left(\tan^{-1}\frac{z1}{z2}\right)$$

When the Expression (13) is equal, Expression (13) can be represented by FIG. 11 (more specifically, by a line L9 in FIG. 11) if the number Z2 of teeth of the pinion P is 10. In this case, an area corresponding to Expression (13) is an area on and under the line L9 in FIG. 11. In addition, a specific area (a hatched area in FIG. 11) satisfying Expression (13) and located on the right side of a line L10 in FIG. 11 where the number-of-teeth ratio Z1/Z2>2.0 is satisfied is an area for setting Z1/Z2 and d2/PCD which enable at least 87% or more of the gear strength of the reference differential device D' to be secured particularly for the differential device thinned in the axial direction where the number Z2 of teeth of the pinion P is 10 and the number-of-teeth ratio Z1/Z2 is greater than 2.0. For reference, a black diamond in FIG. 11 represents an example where the number-of-teeth ratio Z1/Z2 and d2/PCD are set at 40/10 and 20.00%, respectively, and a black triangle in FIG. 11 represents an example where the number-of-teeth ratio Z1/Z2 and d2/PCD are set at 58/10 and 16.67%, respectively. These examples fall within the specific area. A result of a simulation for strength analysis on these examples has confirmed that the gear strength equal to or greater than those of the conventional differential devices (more specifically, the gear strength equal to or greater than 87% of the gear strength of the reference differential device D') were obtained.

Thus, the thinned differential device falling within the specific area is configured as the differential device which, as a whole, is sufficiently reduced in width in the axial direction of the output shafts while securing the gear strength (for example, static torsion load strength) and the maximum amount of torque transmission at approximately the same levels as the conventional existing differential devices which are not thinned in the axial direction thereof. Accordingly, it is possible to achieve effects of: being capable of easily incorporating the differential device in a transmission system, which is under many layout restrictions around the differential device, with great freedom and no specific difficulties; being extremely advantageous in reducing the size of the transmission system; and the like.

Moreover, when the thinned differential device in the specific area has, for example, the structure of the above-mentioned embodiment (more specifically, the structures shown in FIGS. 1 to 6), the thinned differential device in the specific area can obtain an effect derived from the structure shown in the embodiment.

Figure 12:
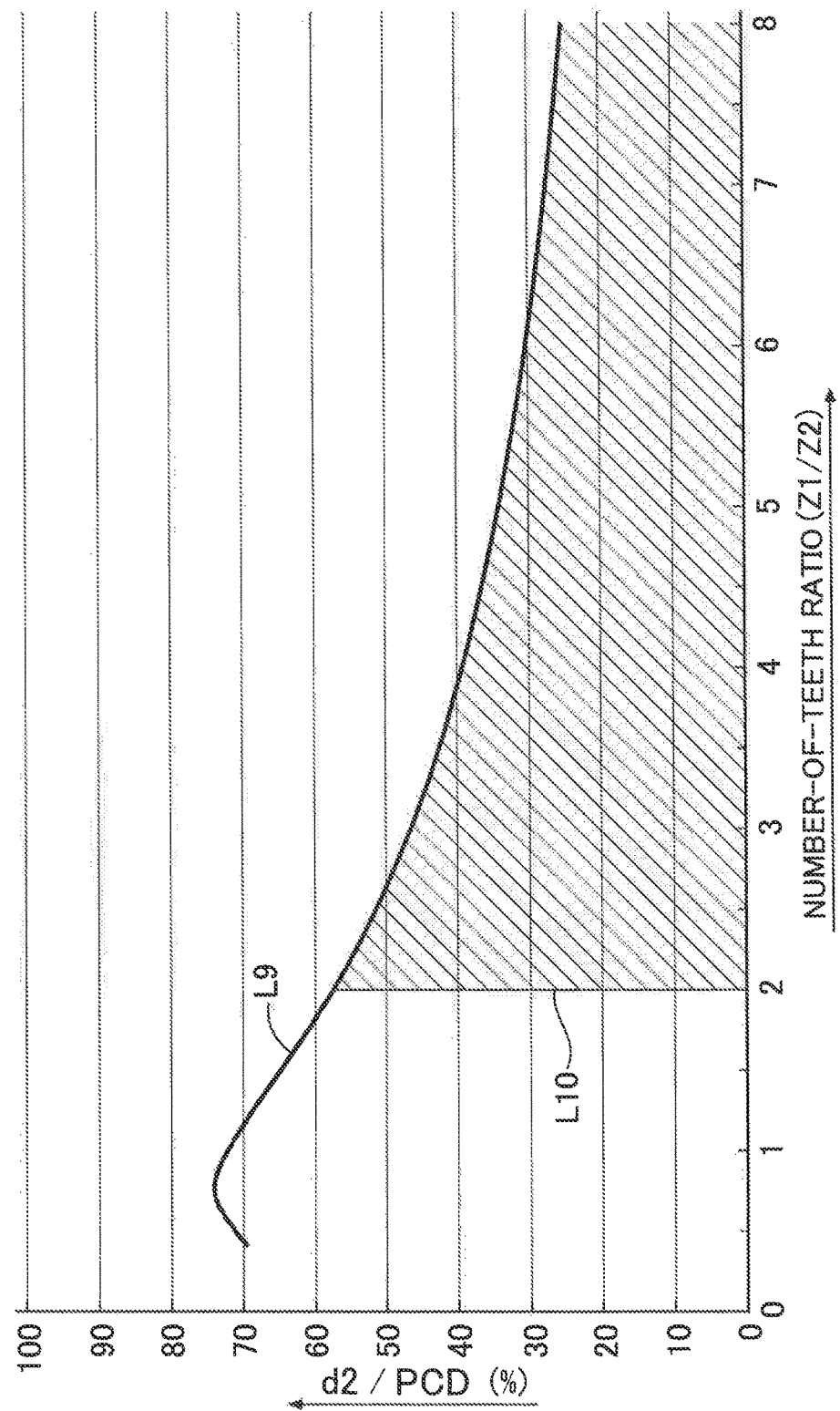
FIG. 12 is a graph showing a relationship between the shaft diameter/pitch cone distance ratio and the number-of-teeth ratio where the number of teeth of the pinion is set at 6.

It should be noted that although the foregoing descriptions (the descriptions in connection with FIGS. 8, 10, 11 in particular) have been provided for the differential device in which the number Z2 of teeth of the pinion P is set at 10, the present invention is not limited to this. For example, when the number Z2 of teeth of the pinion P is set at 6, 12 and 20, too, the thinned differential device capable of achieving the above effects can be represented by Expression (13), as shown by hatched areas in FIGS. 12, 13 and 14. In other words, Expression (13) derived in the above-described manner is applicable regardless of the change in the number Z2 of teeth of the pinion P. For example, even when the number Z2 of teeth of the pinion P is set at 6, 12 and 20, the above effects can be obtained by setting the number Z1 of teeth of the side gear S, the number Z2 of teeth of the pinion P, the shaft diameter d2 of the pinion shaft PS and the pitch cone distance PCD such that Expression (13) is satisfied, like in the case where the number Z2 of teeth of the pinion P is set at 10.

Figure 13:
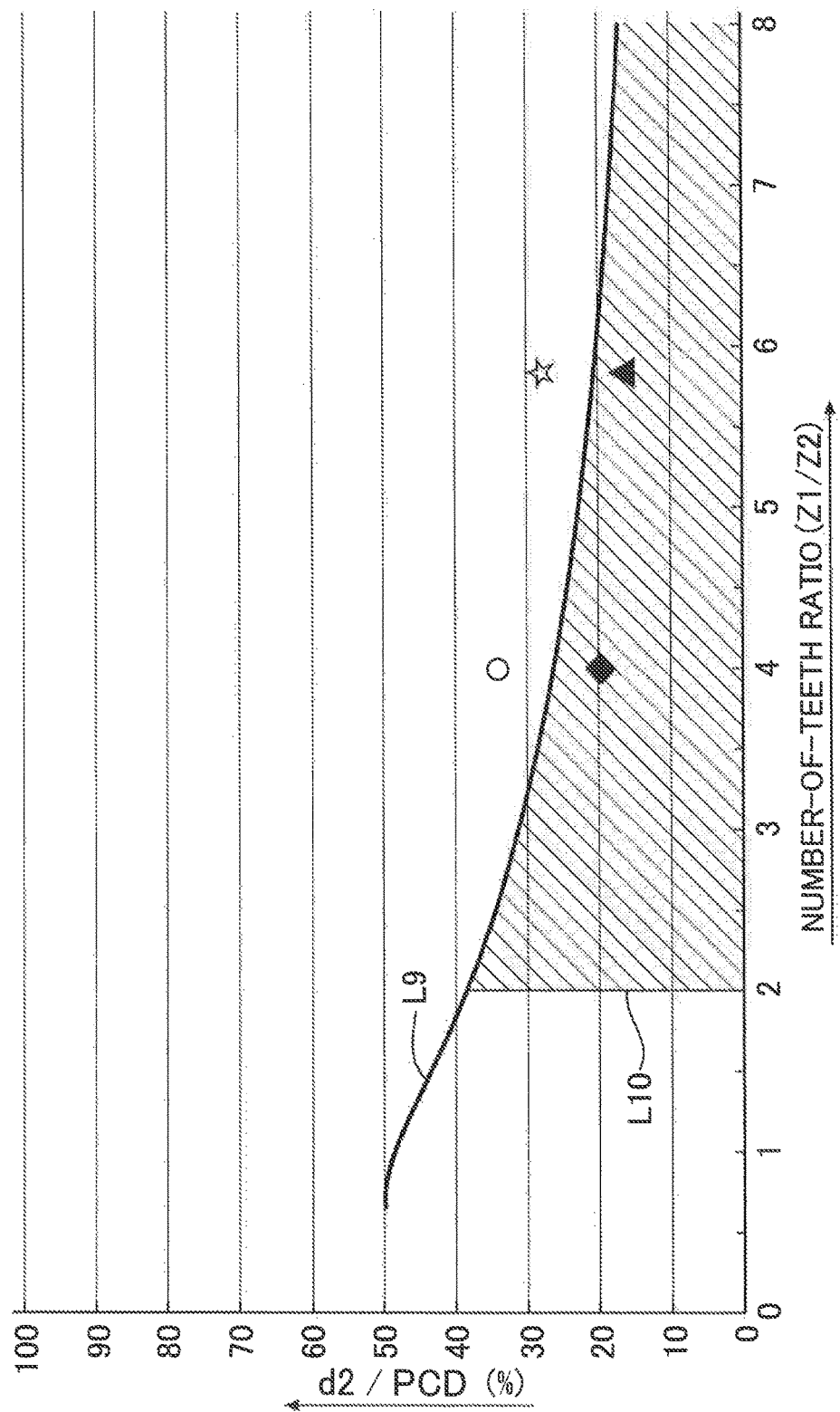
FIG. 13 is a graph showing a relationship between the shaft diameter/pitch cone distance ratio and the number-of-teeth ratio where the number of teeth of the pinion is set at 12.
Figure 14:
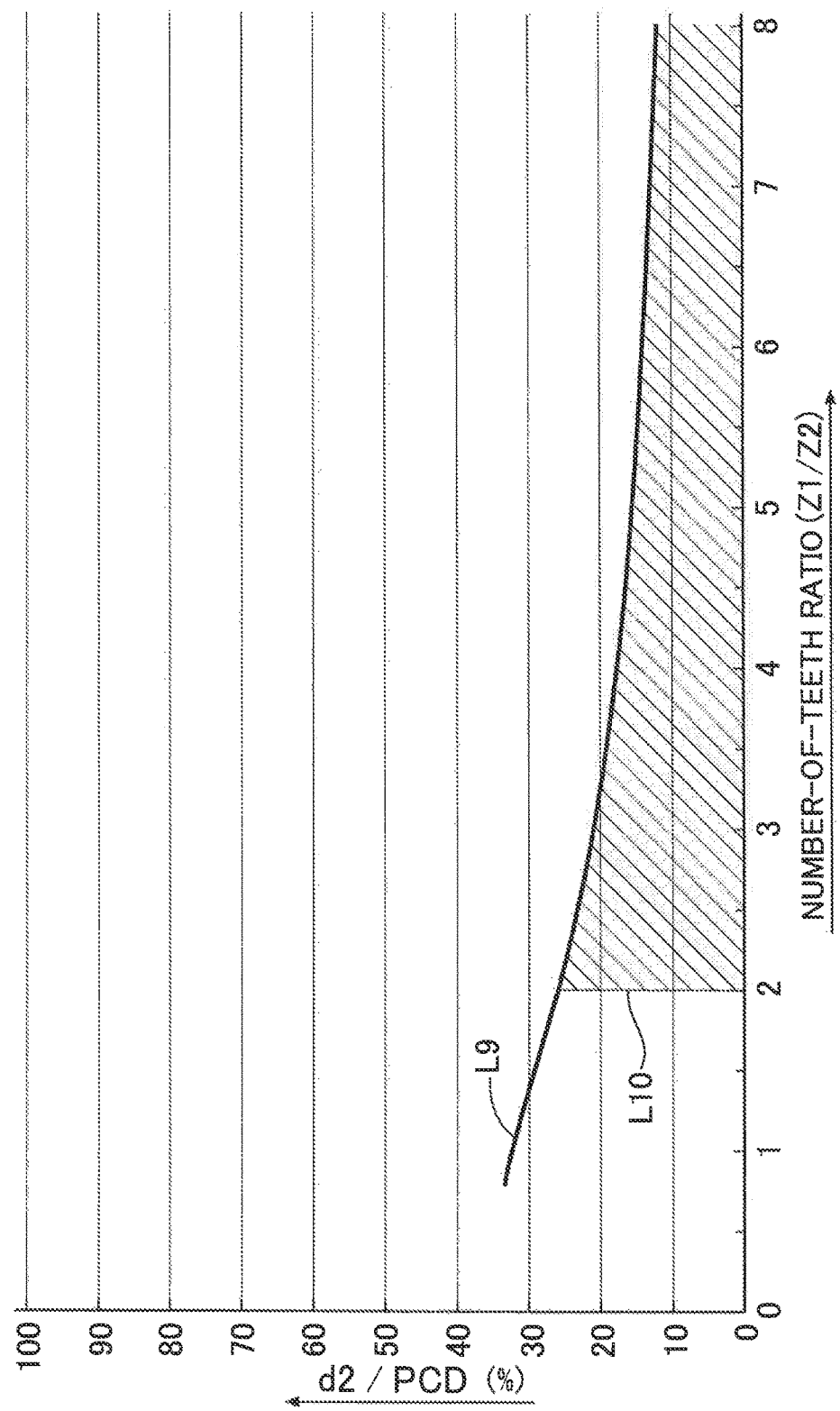
FIG. 14 is a graph showing a relationship between the shaft diameter/pitch cone distance ratio and the number-of-teeth ratio where the number of teeth of the pinion is set at 20.

Furthermore, for reference, a black diamond in FIG. 13 represents an example where when the number Z2 of teeth of the pinion P is 12, the number-of-teeth ratio Z1/Z2 and d2/PCD are set at 48/12 and 20.00%, respectively, and a black triangle in FIG. 13 represents an example where when the number Z2 of teeth of the pinion P is 12, the number-of-teeth ratio Z1/Z2 and d2/PCD are set at 70/12 and 16.67%, respectively. A result of a simulation for strength analysis on these examples has confirmed that the gear strength equal to or greater than those of the conventional differential devices (more specifically, the gear strength equal to or greater than 87% of the gear strength of the reference differential device D') were obtained. Moreover, these examples fall within the specific area, as shown in FIG. 13.

As comparative examples, let us show examples which do not fall within the specific area. A white star in FIG. 11 represents an example where when the number Z2 of teeth of the pinion P is for example 10, the number-of-teeth ratio Z1/Z2 and d2/PCD are set at 58/10 and 27.50%, respectively, and a white circle in FIG. 11 represents an example where when the number Z2 of teeth of the pinion P is for example 10, the number-of-teeth ratio Z1/Z2 and d2/PCD are set at 40/10 and 34.29%, respectively. A white star in FIG. 13 represents an example where when the number Z2 of teeth of the pinion P is for example 12, the number-of-teeth ratio Z1/Z2 and d2/PCD are set at 70/12 and 27.50%, respectively, and a white circle in FIG. 13 represents an example where when the number Z2 of teeth of the pinion P is for example 12, the number-of-teeth ratio Z1/Z2 and d2/PCD are set at 48/12 and 34.29%, respectively. A result of a simulation for strength analysis on these examples has confirmed that the gear strength equal to or greater than those of the conventional differential devices (more specifically, the gear strength equal to or greater than 87% of the gear strength of the reference differential device D') were not obtained. In other words, the above effects cannot be obtained from the examples which do not fall within the specific area.

Although the embodiments of the present invention have been described, the present invention is not limited to the foregoing embodiments. Various design changes may be made to the present invention within a scope not departing from the gist of the present invention.

For example, the foregoing embodiments have shown the differential device in which: the speed reduction gear mechanism RG formed from the planetary gear mechanism is adjacently placed on the one side of the differential case DC as the input member; the output-side element (carrier 23) of the speed reduction gear mechanism RG is connected to the differential case DC (cover portion C'); and the power from the power source is transmitted to the differential case DC via the speed reduction gear mechanism RG. However, an output-side element of a speed reduction gear mechanism formed from a gear mechanism other than the planetary gear mechanism may be connected to the differential case DC.

Furthermore, without using the above mentioned speed reduction gear mechanism, an input tooth portion (final driven gear, final gear) receiving the power from the power source may be integrally formed on, or afterward fixed to, the outer peripheral portion of the differential case DC so that the power from the power source is transmitted to the differential case DC via the input tooth portion.

Moreover, the foregoing embodiments have been shown in which the lubricant oil existing around the outer ends of the boss portions Cb of the cover portions C, C' in the transmission case M is capable of being fed to the oil reserving portions T on the inner end sides of the boss portions Cb, and accordingly to the oil grooves G, using the recessed grooves 8, 8' in the inner peripheries of the boss portions Cb of the cover portions C, C'. Nevertheless, instead of, or in addition to, the recessed grooves 8, 8' like this, oil supply passages guiding the splashed lubricant oil inside the transmission case M to the oil reserving portions T or the inner end portions of the oil grooves G may be provided in appropriate places in the differential case DC (for example, the side wall portions Cs and the boss portions Cb). Incidentally, in that case, the splashed lubricant oil inside the transmission case M may naturally flow into the oil supply passages, or may be actively supplied to the oil supply passages using an unillustrated oil pump.

Besides, in the foregoing embodiments, the washers W are set such that the inner end portions in the radial direction of the washers W are located further radially outward than the inner ends in the radial direction of the back surface portions fg of the tooth portions Sg of the side gears S. Nevertheless, the present invention is not limited to this. For example, the inner end portions in the radial direction of the washers W may extend to the same position as the inner ends in the radial direction of the back surface portions fg of the tooth portions Sg of the side gears S. Thereby, it is possible to more effectively inhibit the decrease in the support rigidity for the back surface portions fg of the tooth portions Sg of the side gears S where large load burden is applied.

In addition, the foregoing embodiments have been shown in which the back surfaces of the pair of the side gears S are respectively covered with the pair of dedicated cover portions C, C' of the differential case DC. In the present invention, however, the dedicated cover portion may be provided to only the back surface of one of the side gears S. In that case, for example, a driving member (for example, the carrier 23 of the speed reduction gear mechanism RG) to be located upstream of a power transmission passage may be arranged on a side with no dedicated cover portion, of the differential case DC, so that the driving member and the differential case DC are connected to each other. In that case, the driving member concurrently serves as the cover portion C' so that the driving member and the differential case DC form the input member of the present invention.

In addition, although the foregoing embodiments have been shown in which the differential device D allows the difference in rotational speed between the left and right axles, the differential device of the present invention may be carried out as a center differential configured to absorb the difference in rotational speed between front wheels and rear wheels.

What is claimed is:

1. A differential device comprising:
   an input member inputted with driving force;
   a differential gear supported in the input member and being able to rotate relative to the input member and revolve around a rotation center of the input member in accordance with a rotation of the input member;
   a pair of output gears each including a tooth portion placed in mesh with the differential gear, and a shaft portion located radially inward of the tooth portion;
   a washer interposed between the input member and a back surface of the tooth portion of each of the output gears; and
   an oil groove provided in a recess shape in a surface of the input member facing a back surface of each of the output gears, the oil groove extending from a periphery of the shaft portion of the output gear to a back surface of the washer, wherein
   the oil groove is arranged offset in a peripheral direction of the output gear from a meshing portion between the tooth portion and the differential gear.

2. The differential device according to claim 1, wherein the input member includes a side wall portion facing the back surface of each of the output gears,
   the side wall portion includes a plurality of through-holes or recessed holes arranged at intervals in a peripheral direction of the input member, and
   the oil groove is arranged passing through between two of the through-holes or recessed holes placed adjacent to each other in the peripheral direction.

3. The differential device according to claim 2, wherein as seen in a projection plane orthogonal to a rotation axis of the output gears, a pair of the oil grooves are arranged with the meshing portions interposed therebetween.

4. The differential device according to claim 2, wherein the oil groove is arranged near the meshing portion in the peripheral direction of the output gear.

5. The differential device according to claim 4, wherein as seen in a projection plane orthogonal to a rotation axis of the output gears, a pair of the oil grooves are arranged with the meshing portions interposed therebetween.

6. The differential device according to claim 2, wherein an oil reserving portion is provided in a recess shape in an inner peripheral portion of a surface of the input member facing each of the output gears, the oil reserving portion facing an outer periphery of the shaft portion of the output gear.

7. The differential device according to claim 6, wherein as seen in a projection plane orthogonal to a rotation axis of the output gears, a pair of the oil grooves are arranged with the meshing portions interposed therebetween.

8. The differential device according to claim 6, wherein the oil groove is arranged near the meshing portion in the peripheral direction of the output gear.

9. The differential device according to claim 8, wherein as seen in a projection plane orthogonal to a rotation axis of the output gears, a pair of the oil grooves are arranged with the meshing portions interposed therebetween.

10. The differential device according to claim 1, wherein an oil reserving portion is provided in a recess shape in an inner peripheral portion of a surface of the input member facing each of the output gears, the oil reserving portion facing an outer periphery of the shaft portion of the output gear.

11. The differential device according to claim 10, wherein the oil groove is arranged near the meshing portion in the peripheral direction of the output gear.

12. The differential device according to claim 11, wherein as seen in a projection plane orthogonal to a rotation axis of the output gears, a pair of the oil grooves are arranged with the meshing portions interposed therebetween.

13. The differential device according to claim 10, wherein as seen in a projection plane orthogonal to a rotation axis of the output gears, a pair of the oil grooves are arranged with the meshing portions interposed therebetween.

14. The differential device according to claim 1, wherein the oil groove is arranged near the meshing portion in the peripheral direction of the output gear.

15. The differential device according to claim 14, wherein as seen in a projection plane orthogonal to a rotation axis of the output gears, a pair of the oil grooves are arranged with the meshing portions interposed therebetween.

16. The differential device according to claim 1, wherein as seen in a projection plane orthogonal to a rotation axis of the output gears, a pair of the oil grooves are arranged with the meshing portions interposed therebetween.

17. The differential device according to claim 1, wherein the differential gear is supported in the input member via a differential gear support portion supported in the input member, and $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and

Z1/Z2>2 is satisfied, where Z1, Z2, d2 and PCD denote a number of teeth of each of the output gears, a number of teeth of the differential gear, a diameter of the differential gear support portion and a pitch cone distance, respectively.

18. The differential device according to claim 17, wherein Z1/Z2≥4 is satisfied.

19. The differential device according to claim 17, wherein Z1/Z2≥5.8 is satisfied.

* * * * *